(12) United States Patent
Ferolito et al.

(10) Patent No.: US 8,169,233 B2
(45) Date of Patent: May 1, 2012

(54) PROGRAMMING OF DIMM TERMINATION RESISTANCE VALUES

(75) Inventors: Philip Arnold Ferolito, Sunnyvale, CA (US); Daniel L. Rosenband, Cambridge, MA (US); David T. Wang, Thousand Oaks, CA (US); Michael John Sebastian Smith, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/797,557

(22) Filed: Jun. 9, 2010

(65) Prior Publication Data
US 2011/0095783 A1 Apr. 28, 2011

Related U.S. Application Data

(60) Provisional application No. 61/185,585, filed on Jun. 9, 2009.

(51) Int. Cl.
*H03K 17/16* (2006.01)
*H03K 19/003* (2006.01)
*G11C 11/00* (2006.01)

(52) U.S. Cl. .......................................... 326/30; 365/148
(58) Field of Classification Search ............... 326/30; 365/63, 51, 198, 191
See application file for complete search history.

(56) References Cited

U.S. PATENT DOCUMENTS

| | | | |
|---|---|---|---|
| 3,800,292 A | 3/1974 | Curley et al. | |
| 4,069,452 A | 1/1978 | Conway et al. | |
| 4,323,965 A | 4/1982 | Johnson et al. | |
| 4,334,307 A | 6/1982 | Bourgeois et al. | |
| 4,345,319 A | 8/1982 | Bernardini et al. | |
| 4,392,212 A | 7/1983 | Miyasaka et al. | |
| 4,525,921 A | 7/1985 | Carson et al. | |
| 4,566,082 A | 1/1986 | Anderson | |
| 4,592,019 A | 5/1986 | Huang et al. | |
| 4,646,128 A | 2/1987 | Carson et al. | |
| 4,698,748 A | 10/1987 | Juzswik et al. | |
| 4,706,166 A | 11/1987 | Go | |
| 4,710,903 A | 12/1987 | Hereth et al. | |
| 4,764,846 A | 8/1988 | Go | |
| 4,780,843 A | 10/1988 | Tietjen | |

(Continued)

FOREIGN PATENT DOCUMENTS
DE 102004051345 5/2006
(Continued)

OTHER PUBLICATIONS

BIOS and Kernel Developer's Guide (BKDG) Family 10h Processor, Sep. 7, 2007, Published for Processor Family Purchasers.

(Continued)

*Primary Examiner* — Shawki Ismail
*Assistant Examiner* — Dylan White
(74) *Attorney, Agent, or Firm* — Fish & Richardson P.C.

(57) ABSTRACT

Systems, methods, and apparatus, including computer program products, for providing termination resistance in a memory module are provided. An apparatus is provided that includes a plurality of memory circuits; an interface circuit operable to communicate with the plurality of memory circuits and to communicate with a memory controller; and a transmission line electrically coupling the interface circuit to a memory controller, wherein the interface circuit is operable to terminate the transmission line with a single termination resistance that is selected based on a plurality of resistance-setting commands received from the memory controller.

20 Claims, 8 Drawing Sheets

U.S. PATENT DOCUMENTS

| | | |
|---|---|---|
| 4,794,597 A | 12/1988 | Ooba et al. |
| 4,796,232 A | 1/1989 | House |
| 4,841,440 A | 6/1989 | Yonezu et al. |
| 4,862,347 A | 8/1989 | Rudy |
| 4,884,237 A | 11/1989 | Mueller et al. |
| 4,887,240 A | 12/1989 | Garverick et al. |
| 4,888,687 A | 12/1989 | Allison et al. |
| 4,899,107 A | 2/1990 | Corbett et al. |
| 4,912,678 A | 3/1990 | Mashiko |
| 4,922,451 A | 5/1990 | Lo et al. |
| 4,935,734 A | 6/1990 | Austin |
| 4,937,791 A | 6/1990 | Steele et al. |
| 4,956,694 A | 9/1990 | Eide |
| 4,982,265 A | 1/1991 | Watanabe et al. |
| 4,983,533 A | 1/1991 | Go |
| 5,025,364 A | 6/1991 | Zellmer |
| 5,072,424 A | 12/1991 | Brent et al. |
| 5,083,266 A | 1/1992 | Watanabe |
| 5,104,820 A | 4/1992 | Go et al. |
| 5,220,672 A | 6/1993 | Nakao et al. |
| 5,241,266 A | 8/1993 | Ahmad et al. |
| 5,252,807 A | 10/1993 | Chizinsky |
| 5,257,233 A | 10/1993 | Schaefer |
| 5,278,796 A | 1/1994 | Tillinghast et al. |
| 5,282,177 A | 1/1994 | McLaury |
| 5,332,922 A | 7/1994 | Oguchi et al. |
| 5,347,428 A | 9/1994 | Carson et al. |
| 5,384,745 A | 1/1995 | Konishi et al. |
| 5,388,265 A | 2/1995 | Volk |
| 5,390,334 A | 2/1995 | Harrison |
| 5,408,190 A | 4/1995 | Wood et al. |
| 5,432,729 A | 7/1995 | Carson et al. |
| 5,448,511 A | 9/1995 | Paurus et al. |
| 5,467,455 A | 11/1995 | Gay et al. |
| 5,483,497 A | 1/1996 | Mochizuki et al. |
| 5,498,886 A | 3/1996 | Hsu et al. |
| 5,502,333 A | 3/1996 | Bertin et al. |
| 5,502,667 A | 3/1996 | Bertin et al. |
| 5,513,135 A | 4/1996 | Dell et al. |
| 5,513,339 A | 4/1996 | Agrawal et al. |
| 5,519,832 A | 5/1996 | Warchol |
| 5,526,320 A | 6/1996 | Zagar et al. |
| 5,530,836 A | 6/1996 | Busch et al. |
| 5,550,781 A | 8/1996 | Sugawara et al. |
| 5,559,990 A | 9/1996 | Cheng et al. |
| 5,561,622 A | 10/1996 | Bertin et al. |
| 5,563,086 A | 10/1996 | Bertin et al. |
| 5,566,344 A | 10/1996 | Hall et al. |
| 5,581,498 A | 12/1996 | Ludwig et al. |
| 5,581,779 A | 12/1996 | Hall et al. |
| 5,590,071 A | 12/1996 | Kolor et al. |
| 5,598,376 A | 1/1997 | Merritt et al. |
| 5,604,714 A | 2/1997 | Manning et al. |
| 5,606,710 A | 2/1997 | Hall et al. |
| 5,608,262 A | 3/1997 | Degani et al. |
| 5,610,864 A | 3/1997 | Manning |
| 5,623,686 A | 4/1997 | Hall et al. |
| 5,627,791 A | 5/1997 | Wright et al. |
| 5,640,337 A | 6/1997 | Huang et al. |
| 5,640,364 A | 6/1997 | Merritt et al. |
| 5,652,724 A | 7/1997 | Manning |
| 5,654,204 A | 8/1997 | Anderson |
| 5,661,677 A | 8/1997 | Rondeau et al. |
| 5,661,695 A | 8/1997 | Zagar et al. |
| 5,668,773 A | 9/1997 | Zagar et al. |
| 5,675,549 A | 10/1997 | Ong et al. |
| 5,680,342 A | 10/1997 | Frankeny |
| 5,682,354 A | 10/1997 | Manning |
| 5,692,121 A | 11/1997 | Bozso et al. |
| 5,692,202 A | 11/1997 | Kardach et al. |
| 5,696,732 A | 12/1997 | Zagar et al. |
| 5,702,984 A | 12/1997 | Bertin et al. |
| 5,703,813 A | 12/1997 | Manning et al. |
| 5,706,247 A | 1/1998 | Merritt et al. |
| RE35,733 E | 2/1998 | Hernandez et al. |
| 5,717,654 A | 2/1998 | Manning |
| 5,721,859 A | 2/1998 | Manning |
| 5,724,288 A | 3/1998 | Cloud et al. |
| 5,729,503 A | 3/1998 | Manning |
| 5,729,504 A | 3/1998 | Cowles |
| 5,742,792 A | 4/1998 | Yanai et al. |
| 5,748,914 A | 5/1998 | Barth et al. |
| 5,752,045 A | 5/1998 | Chen |
| 5,757,703 A | 5/1998 | Merritt et al. |
| 5,761,703 A | 6/1998 | Bolyn |
| 5,781,766 A | 7/1998 | Davis |
| 5,787,457 A | 7/1998 | Miller et al. |
| 5,798,961 A | 8/1998 | Heyden et al. |
| 5,802,010 A | 9/1998 | Zagar et al. |
| 5,802,395 A | 9/1998 | Connolly et al. |
| 5,802,555 A | 9/1998 | Shigeeda |
| 5,812,488 A | 9/1998 | Zagar et al. |
| 5,831,833 A | 11/1998 | Shirakawa et al. |
| 5,831,931 A | 11/1998 | Manning |
| 5,831,932 A | 11/1998 | Merritt et al. |
| 5,834,838 A | 11/1998 | Anderson |
| 5,835,435 A | 11/1998 | Bogin et al. |
| 5,838,165 A | 11/1998 | Chatter |
| 5,838,177 A | 11/1998 | Keeth |
| 5,841,580 A | 11/1998 | Farmwald et al. |
| 5,843,799 A | 12/1998 | Hsu et al. |
| 5,843,807 A | 12/1998 | Burns |
| 5,845,108 A | 12/1998 | Yoo et al. |
| 5,850,368 A | 12/1998 | Ong et al. |
| 5,859,792 A | 1/1999 | Rondeau et al. |
| 5,860,106 A | 1/1999 | Domen et al. |
| 5,870,347 A | 2/1999 | Keeth et al. |
| 5,870,350 A | 2/1999 | Bertin |
| 5,872,907 A | 2/1999 | Griess et al. |
| 5,875,142 A | 2/1999 | Chevallier |
| 5,878,279 A | 3/1999 | Athenes |
| 5,884,088 A | 3/1999 | Kardach et al. |
| 5,901,105 A | 5/1999 | Ong et al. |
| 5,903,500 A | 5/1999 | Tsang et al. |
| 5,905,688 A | 5/1999 | Park |
| 5,907,512 A | 5/1999 | Parkinson et al. |
| 5,915,105 A | 6/1999 | Farmwald et al. |
| 5,915,167 A | 6/1999 | Leedy |
| 5,917,758 A | 6/1999 | Keeth |
| 5,923,611 A | 7/1999 | Ryan |
| 5,924,111 A | 7/1999 | Huang et al. |
| 5,926,435 A | 7/1999 | Park et al. |
| 5,929,650 A | 7/1999 | Pappert et al. |
| 5,943,254 A | 8/1999 | Bakeman, Jr. et al. |
| 5,946,265 A | 8/1999 | Cowles |
| 5,949,254 A | 9/1999 | Keeth |
| 5,953,215 A | 9/1999 | Karabatsos |
| 5,953,263 A | 9/1999 | Farmwald et al. |
| 5,954,804 A | 9/1999 | Farmwald et al. |
| 5,956,233 A | 9/1999 | Yew et al. |
| 5,963,429 A | 10/1999 | Chen |
| 5,963,463 A | 10/1999 | Rondeau et al. |
| 5,963,464 A | 10/1999 | Dell et al. |
| 5,963,504 A | 10/1999 | Manning |
| 5,966,724 A | 10/1999 | Ryan |
| 5,966,727 A | 10/1999 | Nishino |
| 5,969,996 A | 10/1999 | Muranaka et al. |
| 5,973,392 A | 10/1999 | Senba et al. |
| 5,995,424 A | 11/1999 | Lawrence et al. |
| 5,995,443 A | 11/1999 | Farmwald et al. |
| 6,001,671 A | 12/1999 | Fjelstad |
| 6,002,613 A | 12/1999 | Cloud et al. |
| 6,002,627 A | 12/1999 | Chevallier |
| 6,014,339 A | 1/2000 | Kobayashi et al. |
| 6,016,282 A | 1/2000 | Keeth |
| 6,026,050 A | 2/2000 | Baker et al. |
| 6,029,250 A | 2/2000 | Keeth |
| 6,032,214 A | 2/2000 | Farmwald et al. |
| 6,032,215 A | 2/2000 | Farmwald et al. |
| 6,034,916 A | 3/2000 | Lee |
| 6,034,918 A | 3/2000 | Farmwald et al. |
| 6,035,365 A | 3/2000 | Farmwald et al. |
| 6,038,195 A | 3/2000 | Farmwald et al. |
| 6,038,673 A | 3/2000 | Benn et al. |
| 6,044,032 A | 3/2000 | Li |
| 6,047,073 A | 4/2000 | Norris et al. |
| 6,047,344 A | 4/2000 | Kawasumi et al. |

| | | | | | | |
|---|---|---|---|---|---|---|
| 6,053,948 | A | 4/2000 | Vaidyanathan et al. | 6,453,434 B2 | 9/2002 | Delp et al. |
| 6,069,504 | A | 5/2000 | Keeth | 6,455,348 B1 | 9/2002 | Yamaguchi |
| 6,070,217 | A | 5/2000 | Connolly et al. | 6,457,095 B1 | 9/2002 | Volk |
| 6,073,223 | A | 6/2000 | McAllister et al. | 6,459,651 B1 | 10/2002 | Lee et al. |
| 6,075,730 | A | 6/2000 | Barth et al. | 6,473,831 B1 | 10/2002 | Schade |
| 6,075,744 | A | 6/2000 | Tsern et al. | 6,476,476 B1 | 11/2002 | Glenn |
| 6,078,546 | A | 6/2000 | Lee | 6,480,929 B1 | 11/2002 | Gauthier et al. |
| 6,079,025 | A | 6/2000 | Fung | 6,487,102 B1 | 11/2002 | Halbert et al. |
| 6,084,434 | A | 7/2000 | Keeth | 6,489,669 B2 | 12/2002 | Shimada et al. |
| 6,088,290 | A | 7/2000 | Ohtake et al. | 6,490,161 B1 | 12/2002 | Johnson |
| 6,091,251 | A | 7/2000 | Wood et al. | 6,493,789 B2 | 12/2002 | Ware et al. |
| RE36,839 | E | 8/2000 | Simmons et al. | 6,496,440 B2 | 12/2002 | Manning |
| 6,101,152 | A | 8/2000 | Farmwald et al. | 6,496,897 B2 | 12/2002 | Ware et al. |
| 6,101,564 | A | 8/2000 | Athenes et al. | 6,498,766 B2 | 12/2002 | Lee et al. |
| 6,101,612 | A | 8/2000 | Jeddeloh | 6,510,097 B2 | 1/2003 | Fukuyama |
| 6,108,795 | A | 8/2000 | Jeddeloh | 6,510,503 B2 | 1/2003 | Gillingham et al. |
| 6,111,812 | A | 8/2000 | Gans et al. | 6,512,392 B2 | 1/2003 | Fleury et al. |
| 6,134,638 | A | 10/2000 | Olarig et al. | 6,521,984 B2 | 2/2003 | Matsuura |
| 6,154,370 | A | 11/2000 | Degani et al. | 6,526,471 B1 | 2/2003 | Shimomura et al. |
| 6,166,991 | A | 12/2000 | Phelan | 6,526,473 B1 | 2/2003 | Kim |
| 6,182,184 | B1 | 1/2001 | Farmwald et al. | 6,526,484 B1 | 2/2003 | Stacovsky et al. |
| 6,199,151 | B1 | 3/2001 | Williams et al. | 6,545,895 B1 | 4/2003 | Li et al. |
| 6,208,168 | B1 | 3/2001 | Rhee | 6,546,446 B2 | 4/2003 | Farmwald et al. |
| 6,216,246 | B1 | 4/2001 | Shau | 6,553,450 B1 | 4/2003 | Dodd et al. |
| 6,222,739 | B1 | 4/2001 | Bhakta et al. | 6,560,158 B2 | 5/2003 | Choi et al. |
| 6,226,709 | B1 | 5/2001 | Goodwin et al. | 6,563,337 B2 | 5/2003 | Dour |
| 6,233,192 | B1 | 5/2001 | Tanaka | 6,563,759 B2 | 5/2003 | Yahata et al. |
| 6,233,650 | B1 | 5/2001 | Johnson et al. | 6,564,281 B2 | 5/2003 | Farmwald et al. |
| 6,240,048 | B1 | 5/2001 | Matsubara | 6,564,285 B1 | 5/2003 | Mills et al. |
| 6,243,282 | B1 | 6/2001 | Rondeau et al. | 6,574,150 B2 | 6/2003 | Suyama et al. |
| 6,252,807 | B1 | 6/2001 | Suzuki et al. | 6,584,037 B2 | 6/2003 | Farmwald et al. |
| 6,260,097 | B1 | 7/2001 | Farmwald et al. | 6,587,912 B2 | 7/2003 | Leddige et al. |
| 6,260,154 | B1 | 7/2001 | Jeddeloh | 6,590,822 B2 | 7/2003 | Hwang et al. |
| 6,262,938 | B1 | 7/2001 | Lee et al. | 6,594,770 B1 | 7/2003 | Sato et al. |
| 6,266,285 | B1 | 7/2001 | Farmwald et al. | 6,597,616 B2 | 7/2003 | Tsern et al. |
| 6,266,292 | B1 | 7/2001 | Tsern et al. | 6,597,617 B2 | 7/2003 | Ooishi et al. |
| 6,274,395 | B1 | 8/2001 | Weber | 6,614,700 B2 | 9/2003 | Dietrich et al. |
| 6,279,069 | B1 | 8/2001 | Robinson et al. | 6,618,267 B1 | 9/2003 | Dalal et al. |
| 6,295,572 | B1 | 9/2001 | Wu | 6,618,791 B1 | 9/2003 | Dodd et al. |
| 6,298,426 | B1 | 10/2001 | Ajanovic | 6,621,760 B1 | 9/2003 | Ahmad et al. |
| 6,304,511 | B1 | 10/2001 | Gans et al. | 6,630,729 B2 | 10/2003 | Huang |
| 6,307,769 | B1 | 10/2001 | Nuxoll et al. | 6,631,086 B1 | 10/2003 | Bill et al. |
| 6,314,051 | B1 | 11/2001 | Farmwald et al. | 6,639,820 B1 | 10/2003 | Khandekar et al. |
| 6,317,352 | B1 | 11/2001 | Halbert et al. | 6,646,939 B2 | 11/2003 | Kwak |
| 6,317,381 | B1 | 11/2001 | Gans et al. | 6,650,588 B2 | 11/2003 | Yamagata |
| 6,324,120 | B2 | 11/2001 | Farmwald et al. | 6,650,594 B1 | 11/2003 | Lee et al. |
| 6,326,810 | B1 | 12/2001 | Keeth | 6,657,634 B1 | 12/2003 | Sinclair et al. |
| 6,327,664 | B1 | 12/2001 | Dell et al. | 6,657,918 B2 | 12/2003 | Foss et al. |
| 6,330,683 | B1 | 12/2001 | Jeddeloh | 6,657,919 B2 | 12/2003 | Foss et al. |
| 6,336,174 | B1 | 1/2002 | Li et al. | 6,658,016 B1 | 12/2003 | Dai et al. |
| 6,338,108 | B1 | 1/2002 | Motomura | 6,658,530 B1 | 12/2003 | Robertson et al. |
| 6,338,113 | B1 | 1/2002 | Kubo et al. | 6,659,512 B1 | 12/2003 | Harper et al. |
| 6,341,347 | B1 | 1/2002 | Joy et al. | 6,664,625 B2 | 12/2003 | Hiruma |
| 6,343,042 | B1 | 1/2002 | Tsern et al. | 6,665,224 B1 | 12/2003 | Lehmann et al. |
| 6,353,561 | B1 | 3/2002 | Funyu et al. | 6,665,227 B2 | 12/2003 | Fetzer |
| 6,356,105 | B1 | 3/2002 | Volk | 6,668,242 B1 | 12/2003 | Reynov et al. |
| 6,356,500 | B1 | 3/2002 | Cloud et al. | 6,674,154 B2 | 1/2004 | Minamio et al. |
| 6,362,656 | B2 | 3/2002 | Rhee | 6,683,372 B1 | 1/2004 | Wong et al. |
| 6,363,031 | B2 | 3/2002 | Phelan | 6,684,292 B2 | 1/2004 | Piccirillo et al. |
| 6,378,020 | B2 | 4/2002 | Farmwald et al. | 6,690,191 B2 * | 2/2004 | Wu et al. ............ 326/30 |
| 6,381,188 | B1 | 4/2002 | Choi et al. | 6,697,295 B2 | 2/2004 | Farmwald et al. |
| 6,381,668 | B1 | 4/2002 | Lunteren | 6,701,446 B2 | 3/2004 | Tsern et al. |
| 6,389,514 | B1 | 5/2002 | Rokicki | 6,705,877 B1 | 3/2004 | Li et al. |
| 6,392,304 | B1 | 5/2002 | Butler | 6,708,144 B1 | 3/2004 | Merryman et al. |
| 6,414,868 | B1 | 7/2002 | Wong et al. | 6,710,430 B2 | 3/2004 | Minamio et al. |
| 6,418,034 | B1 | 7/2002 | Weber et al. | 6,711,043 B2 | 3/2004 | Friedman et al. |
| 6,421,754 | B1 | 7/2002 | Kau et al. | 6,713,856 B2 | 3/2004 | Tsai et al. |
| 6,424,532 | B2 | 7/2002 | Kawamura | 6,714,891 B2 | 3/2004 | Dendinger |
| 6,426,916 | B2 | 7/2002 | Farmwald et al. | 6,724,684 B2 | 4/2004 | Kim |
| 6,429,029 | B1 | 8/2002 | Eldridge et al. | 6,731,527 B2 | 5/2004 | Brown |
| 6,430,103 | B2 | 8/2002 | Nakayama et al. | 6,742,098 B1 | 5/2004 | Halbert et al. |
| 6,437,600 | B1 | 8/2002 | Keeth | 6,744,687 B2 | 6/2004 | Koo et al. |
| 6,438,057 | B1 | 8/2002 | Ruckerbauer | 6,747,887 B2 | 6/2004 | Halbert et al. |
| 6,442,698 | B2 | 8/2002 | Nizar | 6,751,113 B2 | 6/2004 | Bhakta et al. |
| 6,445,591 | B1 | 9/2002 | Kwong | 6,751,696 B2 | 6/2004 | Farmwald et al. |
| 6,452,826 | B1 | 9/2002 | Kim et al. | 6,754,129 B2 | 6/2004 | Khatri et al. |
| 6,452,863 | B2 | 9/2002 | Farmwald et al. | 6,754,132 B2 | 6/2004 | Kyung |
| 6,453,400 | B1 | 9/2002 | Maesako et al. | 6,757,751 B1 | 6/2004 | Gene |
| 6,453,402 | B1 | 9/2002 | Jeddeloh | 6,762,948 B2 | 7/2004 | Kyun et al. |

| Patent | Type | Date | Inventor |
|---|---|---|---|
| 6,765,812 | B2 | 7/2004 | Anderson |
| 6,766,469 | B2 | 7/2004 | Larson et al. |
| 6,771,526 | B2 | 8/2004 | LaBerge |
| 6,772,359 | B2 | 8/2004 | Kwak et al. |
| 6,779,097 | B2 | 8/2004 | Gillingham et al. |
| 6,785,767 | B2 | 8/2004 | Coulson |
| 6,791,877 | B2 | 9/2004 | Miura et al. |
| 6,795,899 | B2 | 9/2004 | Dodd et al. |
| 6,799,241 | B2 | 9/2004 | Kahn et al. |
| 6,801,989 | B2 | 10/2004 | Johnson et al. |
| 6,807,598 | B2 | 10/2004 | Farmwald et al. |
| 6,807,655 | B1 | 10/2004 | Rehani et al. |
| 6,816,991 | B2 | 11/2004 | Sanghani |
| 6,819,602 | B2 | 11/2004 | Seo et al. |
| 6,819,617 | B2 | 11/2004 | Hwang et al. |
| 6,820,163 | B1 | 11/2004 | McCall et al. |
| 6,820,169 | B2 | 11/2004 | Wilcox et al. |
| 6,826,104 | B2 | 11/2004 | Kawaguchi et al. |
| 6,839,290 | B2 | 1/2005 | Ahmad et al. |
| 6,844,754 | B2 * | 1/2005 | Yamagata ........................ 326/30 |
| 6,845,027 | B2 | 1/2005 | Mayer et al. |
| 6,845,055 | B1 | 1/2005 | Koga et al. |
| 6,847,582 | B2 | 1/2005 | Pan |
| 6,850,449 | B2 | 2/2005 | Takahashi |
| 6,862,202 | B2 | 3/2005 | Schaefer |
| 6,862,249 | B2 | 3/2005 | Kyung |
| 6,862,653 | B1 | 3/2005 | Dodd et al. |
| 6,873,534 | B2 | 3/2005 | Bhakta et al. |
| 6,878,570 | B2 | 4/2005 | Lyu et al. |
| 6,894,933 | B2 | 5/2005 | Kuzmenka et al. |
| 6,898,683 | B2 | 5/2005 | Nakamura |
| 6,908,314 | B2 | 6/2005 | Brown |
| 6,912,778 | B2 | 7/2005 | Ahn et al. |
| 6,914,786 | B1 | 7/2005 | Paulsen et al. |
| 6,917,219 | B2 | 7/2005 | New |
| 6,922,371 | B2 | 7/2005 | Takahashi et al. |
| 6,930,900 | B2 | 8/2005 | Bhakta et al. |
| 6,930,903 | B2 | 8/2005 | Bhakta et al. |
| 6,938,119 | B2 | 8/2005 | Kohn et al. |
| 6,943,450 | B2 | 9/2005 | Fee et al. |
| 6,944,748 | B2 | 9/2005 | Sanches et al. |
| 6,947,341 | B2 | 9/2005 | Stubbs et al. |
| 6,951,982 | B2 | 10/2005 | Chye et al. |
| 6,952,794 | B2 | 10/2005 | Lu |
| 6,961,281 | B2 | 11/2005 | Wong et al. |
| 6,968,416 | B2 | 11/2005 | Moy |
| 6,968,419 | B1 | 11/2005 | Holman |
| 6,970,968 | B1 | 11/2005 | Holman |
| 6,980,021 | B1 | 12/2005 | Srivastava et al. |
| 6,986,118 | B2 | 1/2006 | Dickman |
| 6,992,501 | B2 | 1/2006 | Rapport |
| 6,992,950 | B2 | 1/2006 | Foss et al. |
| 7,000,062 | B2 | 2/2006 | Perego et al. |
| 7,003,618 | B2 | 2/2006 | Perego et al. |
| 7,003,639 | B2 | 2/2006 | Tsern et al. |
| 7,007,095 | B2 | 2/2006 | Chen et al. |
| 7,007,175 | B2 | 2/2006 | Chang et al. |
| 7,010,642 | B2 | 3/2006 | Perego et al. |
| 7,010,736 | B1 | 3/2006 | Teh et al. |
| 7,024,518 | B2 | 4/2006 | Halbert et al. |
| 7,026,708 | B2 | 4/2006 | Cady et al. |
| 7,028,215 | B2 | 4/2006 | Depew et al. |
| 7,028,234 | B2 | 4/2006 | Huckaby et al. |
| 7,033,861 | B1 | 4/2006 | Partridge et al. |
| 7,035,150 | B2 | 4/2006 | Streif et al. |
| 7,043,599 | B1 | 5/2006 | Ware et al. |
| 7,045,396 | B2 | 5/2006 | Crowley et al. |
| 7,045,901 | B2 | 5/2006 | Lin et al. |
| 7,046,538 | B2 | 5/2006 | Kinsley et al. |
| 7,053,470 | B1 | 5/2006 | Sellers et al. |
| 7,053,478 | B2 | 5/2006 | Roper et al. |
| 7,058,776 | B2 | 6/2006 | Lee |
| 7,058,863 | B2 | 6/2006 | Kouchi et al. |
| 7,061,784 | B2 | 6/2006 | Jakobs et al. |
| 7,061,823 | B2 | 6/2006 | Faue et al. |
| 7,066,741 | B2 | 6/2006 | Burns et al. |
| 7,075,175 | B2 | 7/2006 | Kazi et al. |
| 7,079,396 | B2 | 7/2006 | Gates et al. |
| 7,079,441 | B1 | 7/2006 | Partsch et al. |
| 7,079,446 | B2 | 7/2006 | Murtagh et al. |
| 7,085,152 | B2 | 8/2006 | Ellis et al. |
| 7,085,941 | B2 | 8/2006 | Li |
| 7,089,438 | B2 | 8/2006 | Raad |
| 7,093,101 | B2 | 8/2006 | Aasheim et al. |
| 7,103,730 | B2 | 9/2006 | Saxena et al. |
| 7,119,428 | B2 | 10/2006 | Tanie et al. |
| 7,120,727 | B2 | 10/2006 | Lee et al. |
| 7,126,399 | B1 | 10/2006 | Lee |
| 7,127,567 | B2 | 10/2006 | Ramakrishnan et al. |
| 7,133,960 | B1 | 11/2006 | Thompson et al. |
| 7,136,978 | B2 | 11/2006 | Miura et al. |
| 7,149,145 | B2 | 12/2006 | Kim et al. |
| 7,149,824 | B2 | 12/2006 | Johnson |
| 7,173,863 | B2 | 2/2007 | Conley et al. |
| 7,200,021 | B2 | 4/2007 | Raghuram |
| 7,205,789 | B1 | 4/2007 | Karabatsos |
| 7,210,059 | B2 | 4/2007 | Jeddeloh |
| 7,215,561 | B2 | 5/2007 | Park et al. |
| 7,218,566 | B1 | 5/2007 | Totolos, Jr. et al. |
| 7,224,595 | B2 | 5/2007 | Dreps et al. |
| 7,228,264 | B2 | 6/2007 | Barrenschen et al. |
| 7,231,562 | B2 | 6/2007 | Ohlhoff et al. |
| 7,233,541 | B2 | 6/2007 | Yamamoto et al. |
| 7,234,081 | B2 | 6/2007 | Nguyen et al. |
| 7,243,185 | B2 | 7/2007 | See et al. |
| 7,245,541 | B2 | 7/2007 | Janzen |
| 7,254,036 | B2 | 8/2007 | Pauley et al. |
| 7,266,639 | B2 | 9/2007 | Raghuram |
| 7,269,042 | B2 | 9/2007 | Kinsley et al. |
| 7,269,708 | B2 | 9/2007 | Ware |
| 7,274,583 | B2 | 9/2007 | Park et al. |
| 7,277,333 | B2 | 10/2007 | Schaefer |
| 7,286,436 | B2 | 10/2007 | Bhakta et al. |
| 7,289,386 | B2 | 10/2007 | Bhakta et al. |
| 7,296,754 | B2 | 11/2007 | Nishizawa et al. |
| 7,299,330 | B2 | 11/2007 | Gillingham et al. |
| 7,302,598 | B2 | 11/2007 | Suzuki et al. |
| 7,307,863 | B2 | 12/2007 | Yen et al. |
| 7,317,250 | B2 | 1/2008 | Koh et al. |
| 7,363,422 | B2 | 4/2008 | Perego et al. |
| 7,366,947 | B2 | 4/2008 | Gower et al. |
| 7,379,316 | B2 | 5/2008 | Rajan |
| 7,386,656 | B2 | 6/2008 | Rajan et al. |
| 7,392,338 | B2 | 6/2008 | Rajan et al. |
| 7,408,393 | B1 | 8/2008 | Jain et al. |
| 7,409,492 | B2 | 8/2008 | Tanaka et al. |
| 7,414,917 | B2 | 8/2008 | Ruckerbauer et al. |
| 7,428,644 | B2 | 9/2008 | Jeddeloh et al. |
| 7,437,579 | B2 | 10/2008 | Jeddeloh et al. |
| 7,441,064 | B2 | 10/2008 | Gaskins |
| 7,457,122 | B2 | 11/2008 | Lai et al. |
| 7,464,225 | B2 | 12/2008 | Tsern |
| 7,472,220 | B2 | 12/2008 | Rajan et al. |
| 7,474,576 | B2 | 1/2009 | Co et al. |
| 7,480,147 | B2 | 1/2009 | Hoss et al. |
| 7,480,774 | B2 | 1/2009 | Ellis et al. |
| 7,496,777 | B2 | 2/2009 | Kapil |
| 7,515,453 | B2 | 4/2009 | Rajan |
| 7,532,537 | B2 | 5/2009 | Solomon et al. |
| 7,539,800 | B2 | 5/2009 | Dell et al. |
| 7,573,136 | B2 | 8/2009 | Jiang et al. |
| 7,580,312 | B2 | 8/2009 | Rajan et al. |
| 7,581,121 | B2 | 8/2009 | Barth et al. |
| 7,581,127 | B2 | 8/2009 | Rajan et al. |
| 7,590,796 | B2 | 9/2009 | Rajan et al. |
| 7,599,205 | B2 | 10/2009 | Rajan |
| 7,606,245 | B2 | 10/2009 | Ma et al. |
| 7,609,567 | B2 | 10/2009 | Rajan et al. |
| 7,613,880 | B2 | 11/2009 | Miura et al. |
| 7,619,912 | B2 | 11/2009 | Bhakta et al. |
| 7,724,589 | B2 | 5/2010 | Rajan et al. |
| 7,730,338 | B2 | 6/2010 | Rajan et al. |
| 7,761,724 | B2 | 7/2010 | Rajan et al. |
| 2001/0000822 | A1 | 5/2001 | Dell et al. |
| 2001/0003198 | A1 | 6/2001 | Wu |
| 2001/0011322 | A1 | 8/2001 | Stolt et al. |
| 2001/0021106 | A1 | 9/2001 | Weber et al. |
| 2001/0021137 | A1 | 9/2001 | Kai et al. |

| | | |
|---|---|---|
| 2001/0046129 A1 | 11/2001 | Broglia et al. |
| 2001/0046163 A1 | 11/2001 | Yanagawa |
| 2002/0002662 A1 | 1/2002 | Olarig et al. |
| 2002/0004897 A1 | 1/2002 | Kao et al. |
| 2002/0015340 A1 | 2/2002 | Batinovich |
| 2002/0019961 A1 | 2/2002 | Blodgett |
| 2002/0034068 A1 | 3/2002 | Weber et al. |
| 2002/0038405 A1 | 3/2002 | Leddige et al. |
| 2002/0041507 A1 | 4/2002 | Woo et al. |
| 2002/0051398 A1 | 5/2002 | Mizugaki |
| 2002/0060945 A1 | 5/2002 | Ikeda |
| 2002/0064073 A1 | 5/2002 | Chien |
| 2002/0064083 A1 | 5/2002 | Ryu et al. |
| 2002/0089831 A1 | 7/2002 | Forthun |
| 2002/0089970 A1 | 7/2002 | Asada et al. |
| 2002/0094671 A1 | 7/2002 | Distefano et al. |
| 2002/0121650 A1 | 9/2002 | Minamio et al. |
| 2002/0121670 A1 | 9/2002 | Minamio et al. |
| 2002/0124195 A1 | 9/2002 | Nizar |
| 2002/0129204 A1 | 9/2002 | Leighnor et al. |
| 2002/0145900 A1 | 10/2002 | Schaefer |
| 2002/0165706 A1* | 11/2002 | Raynham .................... 703/25 |
| 2002/0167092 A1 | 11/2002 | Fee et al. |
| 2002/0172024 A1 | 11/2002 | Hui et al. |
| 2002/0174274 A1 | 11/2002 | Wu et al. |
| 2002/0184438 A1 | 12/2002 | Usui |
| 2003/0002262 A1 | 1/2003 | Benisek et al. |
| 2003/0011993 A1 | 1/2003 | Summers et al. |
| 2003/0016550 A1 | 1/2003 | Yoo et al. |
| 2003/0021175 A1 | 1/2003 | Tae Kwak |
| 2003/0026155 A1 | 2/2003 | Yamagata |
| 2003/0026159 A1 | 2/2003 | Frankowsky et al. |
| 2003/0035312 A1 | 2/2003 | Halbert et al. |
| 2003/0039158 A1 | 2/2003 | Horiguchi et al. |
| 2003/0041295 A1 | 2/2003 | Hou et al. |
| 2003/0061458 A1 | 3/2003 | Wilcox et al. |
| 2003/0061459 A1 | 3/2003 | Aboulenein et al. |
| 2003/0093614 A1 | 5/2003 | Kohn et al. |
| 2003/0101392 A1 | 5/2003 | Lee |
| 2003/0105932 A1 | 6/2003 | David et al. |
| 2003/0117875 A1 | 6/2003 | Lee et al. |
| 2003/0123389 A1 | 7/2003 | Russell et al. |
| 2003/0126338 A1 | 7/2003 | Dodd et al. |
| 2003/0127737 A1 | 7/2003 | Takahashi |
| 2003/0131160 A1 | 7/2003 | Hampel et al. |
| 2003/0145163 A1 | 7/2003 | Seo et al. |
| 2003/0158995 A1 | 8/2003 | Lee et al. |
| 2003/0164539 A1 | 9/2003 | Yau |
| 2003/0164543 A1 | 9/2003 | Kheng Lee |
| 2003/0182513 A1 | 9/2003 | Dodd et al. |
| 2003/0183934 A1 | 10/2003 | Barrett |
| 2003/0189868 A1 | 10/2003 | Riesenman et al. |
| 2003/0189870 A1 | 10/2003 | Wilcox |
| 2003/0191888 A1 | 10/2003 | Klein |
| 2003/0191915 A1 | 10/2003 | Saxena et al. |
| 2003/0200382 A1 | 10/2003 | Wells et al. |
| 2003/0200474 A1 | 10/2003 | Li |
| 2003/0205802 A1 | 11/2003 | Segaram et al. |
| 2003/0206476 A1 | 11/2003 | Joo |
| 2003/0217303 A1 | 11/2003 | Chua-Eoan et al. |
| 2003/0223290 A1 | 12/2003 | Park et al. |
| 2003/0227798 A1 | 12/2003 | Pax |
| 2003/0229821 A1 | 12/2003 | Ma |
| 2003/0230801 A1 | 12/2003 | Jiang et al. |
| 2003/0231540 A1 | 12/2003 | Lazar et al. |
| 2003/0231542 A1 | 12/2003 | Zaharinova-Papazova et al. |
| 2003/0234664 A1 | 12/2003 | Yamagata |
| 2004/0016994 A1 | 1/2004 | Huang |
| 2004/0027902 A1 | 2/2004 | Ooishi et al. |
| 2004/0034732 A1 | 2/2004 | Valin et al. |
| 2004/0034755 A1 | 2/2004 | LaBerge et al. |
| 2004/0037133 A1 | 2/2004 | Park et al. |
| 2004/0044808 A1 | 3/2004 | Salmon et al. |
| 2004/0047228 A1 | 3/2004 | Chen |
| 2004/0057317 A1 | 3/2004 | Schaefer |
| 2004/0064647 A1 | 4/2004 | DeWhitt et al. |
| 2004/0064767 A1 | 4/2004 | Huckaby et al. |
| 2004/0083324 A1 | 4/2004 | Rabinovitz et al. |
| 2004/0088475 A1 | 5/2004 | Streif et al. |
| 2004/0100837 A1 | 5/2004 | Lee |
| 2004/0117723 A1 | 6/2004 | Foss |
| 2004/0123173 A1 | 6/2004 | Emberling et al. |
| 2004/0125635 A1 | 7/2004 | Kuzmenka |
| 2004/0133736 A1 | 7/2004 | Kyung |
| 2004/0139359 A1 | 7/2004 | Samson et al. |
| 2004/0145963 A1 | 7/2004 | Byon |
| 2004/0151038 A1 | 8/2004 | Ruckerbauer et al. |
| 2004/0174765 A1 | 9/2004 | Seo et al. |
| 2004/0177079 A1 | 9/2004 | Gluhovsky et al. |
| 2004/0178824 A1 | 9/2004 | Pan |
| 2004/0184324 A1 | 9/2004 | Pax |
| 2004/0186956 A1 | 9/2004 | Perego et al. |
| 2004/0188704 A1 | 9/2004 | Halbert et al. |
| 2004/0196732 A1 | 10/2004 | Lee |
| 2004/0205433 A1 | 10/2004 | Gower et al. |
| 2004/0208173 A1 | 10/2004 | Di Gregorio |
| 2004/0225858 A1 | 11/2004 | Brueggen |
| 2004/0228166 A1 | 11/2004 | Braun et al. |
| 2004/0228196 A1 | 11/2004 | Kwak et al. |
| 2004/0228203 A1 | 11/2004 | Koo |
| 2004/0230932 A1 | 11/2004 | Dickmann |
| 2004/0236877 A1 | 11/2004 | Burton |
| 2004/0250989 A1 | 12/2004 | Im et al. |
| 2004/0256638 A1 | 12/2004 | Perego et al. |
| 2004/0257847 A1 | 12/2004 | Matsui et al. |
| 2004/0260957 A1 | 12/2004 | Jeddeloh et al. |
| 2004/0264255 A1 | 12/2004 | Royer |
| 2004/0268161 A1 | 12/2004 | Ross |
| 2005/0018495 A1 | 1/2005 | Bhakta et al. |
| 2005/0021874 A1 | 1/2005 | Georgiou et al. |
| 2005/0024963 A1 | 2/2005 | Jakobs et al. |
| 2005/0027928 A1 | 2/2005 | Avraham et al. |
| 2005/0028038 A1 | 2/2005 | Pomaranski et al. |
| 2005/0034004 A1 | 2/2005 | Bunker et al. |
| 2005/0036350 A1 | 2/2005 | So et al. |
| 2005/0041504 A1 | 2/2005 | Perego et al. |
| 2005/0044303 A1 | 2/2005 | Perego et al. |
| 2005/0044305 A1 | 2/2005 | Jakobs et al. |
| 2005/0047192 A1 | 3/2005 | Matsui et al. |
| 2005/0071543 A1 | 3/2005 | Ellis et al. |
| 2005/0078532 A1 | 4/2005 | Ruckerbauer et al. |
| 2005/0081085 A1 | 4/2005 | Ellis et al. |
| 2005/0099834 A1 | 5/2005 | Funaba et al. |
| 2005/0102590 A1 | 5/2005 | Norris et al. |
| 2005/0105318 A1 | 5/2005 | Funaba et al. |
| 2005/0108460 A1 | 5/2005 | David |
| 2005/0127531 A1 | 6/2005 | Tay et al. |
| 2005/0132158 A1 | 6/2005 | Hampel et al. |
| 2005/0135176 A1 | 6/2005 | Ramakrishnan et al. |
| 2005/0138267 A1 | 6/2005 | Bains et al. |
| 2005/0138304 A1 | 6/2005 | Ramakrishnan et al. |
| 2005/0139977 A1 | 6/2005 | Nishio et al. |
| 2005/0141199 A1 | 6/2005 | Chiou et al. |
| 2005/0149662 A1 | 7/2005 | Perego et al. |
| 2005/0152212 A1 | 7/2005 | Yang et al. |
| 2005/0156934 A1 | 7/2005 | Perego et al. |
| 2005/0166026 A1 | 7/2005 | Ware et al. |
| 2005/0193163 A1 | 9/2005 | Perego et al. |
| 2005/0194676 A1 | 9/2005 | Fukuda et al. |
| 2005/0194991 A1 | 9/2005 | Dour et al. |
| 2005/0195629 A1 | 9/2005 | Leddige et al. |
| 2005/0201063 A1 | 9/2005 | Lee et al. |
| 2005/0204111 A1 | 9/2005 | Natarajan |
| 2005/0207255 A1 | 9/2005 | Perego et al. |
| 2005/0210196 A1 | 9/2005 | perego et al. |
| 2005/0223179 A1 | 10/2005 | Perego et al. |
| 2005/0224948 A1 | 10/2005 | Lee et al. |
| 2005/0232049 A1 | 10/2005 | Park |
| 2005/0235119 A1 | 10/2005 | Sechrest et al. |
| 2005/0235131 A1 | 10/2005 | Ware |
| 2005/0237838 A1 | 10/2005 | Kwak et al. |
| 2005/0243635 A1 | 11/2005 | Schaefer |
| 2005/0249011 A1 | 11/2005 | Maeda |
| 2005/0259504 A1 | 11/2005 | Murtugh et al. |
| 2005/0263312 A1 | 12/2005 | Bolken et al. |
| 2005/0265506 A1 | 12/2005 | Foss et al. |
| 2005/0269715 A1 | 12/2005 | Yoo |
| 2005/0278474 A1 | 12/2005 | Perersen et al. |

| | | |
|---|---|---|
| 2005/0281096 A1 | 12/2005 | Bhakta et al. |
| 2005/0281123 A1 | 12/2005 | Bell et al. |
| 2005/0283572 A1 | 12/2005 | Ishihara |
| 2005/0285174 A1 | 12/2005 | Saito et al. |
| 2005/0289292 A1 | 12/2005 | Morrow et al. |
| 2005/0289317 A1 | 12/2005 | Liou et al. |
| 2006/0002201 A1 | 1/2006 | Janzen |
| 2006/0010339 A1 | 1/2006 | Klein |
| 2006/0026484 A1 | 2/2006 | Hollums |
| 2006/0038597 A1 | 2/2006 | Becker et al. |
| 2006/0039204 A1 | 2/2006 | Cornelius |
| 2006/0039205 A1 | 2/2006 | Cornelius |
| 2006/0041711 A1 | 2/2006 | Miura et al. |
| 2006/0041730 A1 | 2/2006 | Larson |
| 2006/0044909 A1 | 3/2006 | Kinsley et al. |
| 2006/0044913 A1 | 3/2006 | Klein et al. |
| 2006/0049502 A1 | 3/2006 | Goodwin et al. |
| 2006/0050574 A1 | 3/2006 | Streif et al. |
| 2006/0056244 A1 | 3/2006 | Ware |
| 2006/0062047 A1 | 3/2006 | Bhakta et al. |
| 2006/0067141 A1 | 3/2006 | Perego et al. |
| 2006/0085616 A1 | 4/2006 | Zeighami et al. |
| 2006/0087900 A1 | 4/2006 | Bucksch et al. |
| 2006/0090031 A1 | 4/2006 | Kirshenbaum et al. |
| 2006/0090054 A1 | 4/2006 | Choi et al. |
| 2006/0106951 A1 | 5/2006 | Bains |
| 2006/0112214 A1 | 5/2006 | Yeh |
| 2006/0112219 A1 | 5/2006 | Chawla et al. |
| 2006/0117152 A1 | 6/2006 | Amidi et al. |
| 2006/0117160 A1 | 6/2006 | Jackson et al. |
| 2006/0118933 A1 | 6/2006 | Haba |
| 2006/0120193 A1 | 6/2006 | Casper |
| 2006/0123265 A1 | 6/2006 | Ruckerbauer et al. |
| 2006/0126369 A1 | 6/2006 | Raghuram |
| 2006/0129712 A1 | 6/2006 | Raghuram |
| 2006/0129740 A1 | 6/2006 | Ruckerbauer et al. |
| 2006/0129755 A1 | 6/2006 | Raghuram |
| 2006/0133173 A1 | 6/2006 | Jain et al. |
| 2006/0136791 A1 | 6/2006 | Nierle |
| 2006/0149982 A1 | 7/2006 | Vogt |
| 2006/0174082 A1 | 8/2006 | Bellows et al. |
| 2006/0176744 A1 | 8/2006 | Stave |
| 2006/0179333 A1 | 8/2006 | Brittain et al. |
| 2006/0179334 A1 | 8/2006 | Brittain et al. |
| 2006/0180926 A1 | 8/2006 | Mullen et al. |
| 2006/0181953 A1 | 8/2006 | Rotenberg et al. |
| 2006/0195631 A1 | 8/2006 | Rajamani |
| 2006/0198178 A1 | 9/2006 | Kinsley et al. |
| 2006/0203590 A1 | 9/2006 | Mori et al. |
| 2006/0206738 A1 | 9/2006 | Jeddeloh et al. |
| 2006/0233012 A1 | 10/2006 | Sekiguchi et al. |
| 2006/0236165 A1 | 10/2006 | Cepulis et al. |
| 2006/0236201 A1 | 10/2006 | Gower et al. |
| 2006/0248261 A1 | 11/2006 | Jacob et al. |
| 2006/0248387 A1 | 11/2006 | Nicholson et al. |
| 2006/0262586 A1 | 11/2006 | Solomon et al. |
| 2006/0294295 A1 | 12/2006 | Fukuzo |
| 2007/0005998 A1 | 1/2007 | Jain et al. |
| 2007/0050530 A1 | 3/2007 | Rajan |
| 2007/0058471 A1 | 3/2007 | Rajan et al. |
| 2007/0070669 A1 | 3/2007 | Tsern |
| 2007/0088995 A1 | 4/2007 | Tsern et al. |
| 2007/0091696 A1 | 4/2007 | Niggemeier et al. |
| 2007/0106860 A1 | 5/2007 | Foster, Sr. et al. |
| 2007/0136537 A1 | 6/2007 | Doblar et al. |
| 2007/0162700 A1 | 7/2007 | Fortin et al. |
| 2007/0188997 A1 | 8/2007 | Hockanson et al. |
| 2007/0192563 A1 | 8/2007 | Rajan et al. |
| 2007/0195613 A1 | 8/2007 | Rajan et al. |
| 2007/0204075 A1 | 8/2007 | Rajan et al. |
| 2007/0216445 A1 | 9/2007 | Raghavan et al. |
| 2007/0247194 A1 | 10/2007 | Jain |
| 2007/0279084 A1* | 12/2007 | Oh et al. .................... 326/30 |
| 2007/0288683 A1 | 12/2007 | Panabaker et al. |
| 2007/0288686 A1 | 12/2007 | Arcedera et al. |
| 2007/0288687 A1 | 12/2007 | Panabaker et al. |
| 2008/0002447 A1 | 1/2008 | Gulachenski et al. |
| 2008/0010435 A1 | 1/2008 | Smith et al. |
| 2008/0025108 A1 | 1/2008 | Rajan et al. |
| 2008/0025122 A1 | 1/2008 | Schakel et al. |
| 2008/0025136 A1 | 1/2008 | Rajan et al. |
| 2008/0025137 A1 | 1/2008 | Rajan et al. |
| 2008/0027697 A1 | 1/2008 | Rajan et al. |
| 2008/0027702 A1 | 1/2008 | Rajan et al. |
| 2008/0027703 A1 | 1/2008 | Rajan et al. |
| 2008/0028135 A1 | 1/2008 | Rajan et al. |
| 2008/0028136 A1 | 1/2008 | Schakel et al. |
| 2008/0028137 A1 | 1/2008 | Schakel et al. |
| 2008/0031030 A1 | 2/2008 | Rajan et al. |
| 2008/0031072 A1 | 2/2008 | Rajan et al. |
| 2008/0037353 A1 | 2/2008 | Rajan et al. |
| 2008/0056014 A1 | 3/2008 | Rajan et al. |
| 2008/0062773 A1 | 3/2008 | Rajan et al. |
| 2008/0065820 A1 | 3/2008 | Gillingham et al. |
| 2008/0082763 A1 | 4/2008 | Rajan et al. |
| 2008/0086588 A1 | 4/2008 | Danilak et al. |
| 2008/0089034 A1 | 4/2008 | Hoss et al. |
| 2008/0098277 A1* | 4/2008 | Hazelzet ..................... 714/753 |
| 2008/0103753 A1 | 5/2008 | Rajan et al. |
| 2008/0104314 A1 | 5/2008 | Rajan et al. |
| 2008/0109206 A1 | 5/2008 | Rajan et al. |
| 2008/0109595 A1 | 5/2008 | Rajan et al. |
| 2008/0109597 A1 | 5/2008 | Schakel et al. |
| 2008/0109598 A1 | 5/2008 | Schakel et al. |
| 2008/0115006 A1 | 5/2008 | Smith et al. |
| 2008/0120443 A1* | 5/2008 | Rajan et al. .................... 710/24 |
| 2008/0120458 A1 | 5/2008 | Gillingham et al. |
| 2008/0123459 A1 | 5/2008 | Rajan et al. |
| 2008/0126687 A1 | 5/2008 | Rajan et al. |
| 2008/0126688 A1 | 5/2008 | Rajan et al. |
| 2008/0126689 A1 | 5/2008 | Rajan et al. |
| 2008/0126690 A1 | 5/2008 | Rajan et al. |
| 2008/0126692 A1 | 5/2008 | Rajan et al. |
| 2008/0133825 A1 | 6/2008 | Rajan et al. |
| 2008/0159027 A1 | 7/2008 | Kim |
| 2008/0170425 A1 | 7/2008 | Rajan |
| 2008/0195894 A1 | 8/2008 | Schreck et al. |
| 2008/0239857 A1 | 10/2008 | Rajan et al. |
| 2008/0239858 A1 | 10/2008 | Rajan et al. |
| 2009/0024789 A1 | 1/2009 | Rajan et al. |
| 2009/0024790 A1 | 1/2009 | Rajan et al. |
| 2009/0109613 A1 | 4/2009 | Legen et al. |
| 2009/0216939 A1 | 8/2009 | Smith et al. |
| 2009/0285031 A1 | 11/2009 | Rajan et al. |
| 2009/0290442 A1 | 11/2009 | Rajan |
| 2010/0005218 A1 | 1/2010 | Gower et al. |
| 2010/0020585 A1 | 1/2010 | Rajan |
| 2010/0257304 A1 | 10/2010 | Rajan et al. |
| 2010/0271888 A1 | 10/2010 | Rajan |
| 2010/0281280 A1 | 11/2010 | Rajan et al. |

FOREIGN PATENT DOCUMENTS

| | | |
|---|---|---|
| DE | 102004053316 | 5/2006 |
| DE | 102005036528 | 2/2007 |
| EP | 0644547 | 3/1995 |
| JP | 62121978 | 6/1987 |
| JP | 01-171047 | 7/1989 |
| JP | 03-29357 | 2/1991 |
| JP | 03-276487 B2 | 12/1991 |
| JP | 03-286234 | 12/1991 |
| JP | 07-141870 | 6/1995 |
| JP | 08-77097 | 3/1996 |
| JP | 11-149775 | 6/1999 |
| JP | 22025255 A2 | 1/2002 |
| JP | 3304893 B2 | 5/2002 |
| JP | 2006236388 | 9/2006 |
| KR | 1020040062717 | 7/2004 |
| WO | WO95/05676 | 2/1995 |
| WO | WO9900734 | 1/1999 |
| WO | WO01/90900 | 11/2001 |
| WO | WO01/97160 | 12/2001 |
| WO | WO2007/002324 | 1/2007 |
| WO | WO2007/028109 | 3/2007 |
| WO | WO2007/038225 | 4/2007 |
| WO | WO2007/095080 | 8/2007 |
| WO | WO2008/063251 | 5/2008 |

OTHER PUBLICATIONS

Skerlj et al. "Buffer Device for Memory Modules". 2006, p. 1.
Fang et al., W. Power Complexity Analysis of Adiabatic SRAM, 6th Int. Conference on ASIC, vol. 1, Oct. 2005, pp. 334-337.
Kellerbauer, R. "Die Schnelle Million," with translation, "The Quick Million: Memory Expansion for 1040 ST and Mega ST 1," Dec. 1991.
Pavan et al., P. A Complete Model of E2PROM Memory Cells for Circuit Simulations, IEEE Transactions on Computer-Aided Design of Integrated Circuits and Systems, vol. 22, No. 8, Aug. 2003, pp. 1072-1079.
Supplemental European Search Report and Search Opinion issued Sep. 21, 2009 in European Application No. 07870726.2, 8 pp.
Wu et al., "eNVy: A Non-Volatile, Main Memory Storage System", ASPLOS-VI Proceedings, Oct. 4-7, 1994, pp. 86-97.
Using Two Chip Selects to Enable Quad Rank, From IP.Com # 000132468D, Feb. 26, 2008.
Buffer Device for Memory Modules (DIMM), IP.com Prior Art Database, <URL: http://ip.com/IPCOM/000144850>, Feb. 10, 2007, 1 pg.
German Office Action from German Patent Application No. 11 2006 001 810.8-55 Dated Feb. 18, 2009 (With Translation).
German Office Action from German Patent Application No. 11 2006 002 300.4-55 Dated May 11, 2009 (With Translation).
Great Britain Office Action from GB Patent Application No. GB0800734.6 Dated Mar. 1, 2010.
Great Britain Office Action from GB Patent Application No. GB0803913.3 Dated Mar. 1, 2010.
Preliminary Report on Patentability From PCT Application No. PCT/US06/24360 Dated on Jan. 10, 2008.
Written Opinion From PCT Application No. PCT/US06/24360 Dated on Jan. 8, 2007.
International Search Report From PCT Application No. PCT/US06/34390 Dated on Nov. 21, 2007.
Written Opinion From PCT Application No. PCT/US06/34390 Dated on Nov. 21, 2007.
International Preliminary Examination Report From PCT Application No. PCT/US07/016385 Dated Feb. 3, 2009.
Search Report and Written Opinion From PCT Application No. PCT/US07/03460 Dated on Feb. 14, 2008.
Non-Final Office Action from U.S. Appl. No. 11/461,420 Dated Jul. 23, 2009.
Final Office Action from U.S. Appl. No. 11/461,420 Dated Apr. 28, 2010.
Non-Final Office Action from U.S. Appl. No. 11/461,427 Dated Sep. 5, 2008.
Final Office Action from U.S. Appl. No. 11/461,430 Dated Sep. 8, 2008.
Non-Final Office Action from U.S. Appl. No. 11/461,430 Dated Feb. 19, 2009.
Notice of Allowance from U.S. Appl. No. 11/461,430 Dated Sep. 9, 2009.
Final Office Action from U.S. Appl. No. 11/461,435 Dated Jan. 28, 2009.
Non-Final Office Action from U.S. Appl. No. 11/461,435 Dated Aug. 5, 2009.
Final Office Action from U.S. Appl. No. 11/461,435 Dated May 13, 2010.
Non-Final Office Action from U.S. Appl. No. 11/461,437 Dated Jan. 26, 2009.
Final Rejection From U.S. Appl. No. 11/461,437 Dated Nov. 10, 2009.
Non-Final Office Action from U.S. Appl. No. 11/461,441 Dated Apr. 2, 2009.
Notice of Allowance from U.S. Appl. No. 11/474,075 Dated Nov. 26, 2008.
Non-Final Office Action from U.S. Appl. No. 11/474,076 Dated Nov. 3, 2008.
Non-Final Office Action from U.S. Appl. No. 11/515,167 Dated Sep. 25, 2009.
Final Office Action from U.S. Appl. No. 11/515,167 Dated Jun. 3, 2010.
Non-Final Office Action from U.S. Appl. No. 11/515,223 Dated Sep. 22, 2009.
Notice of Allowance from U.S. Appl. No. 11/515,223 Dated Jul. 30, 2010.
Non-Final Office Action from U.S. Appl. No. 11/524,811 Dated Sep. 17, 2008.
Non-Final Office Action from U.S. Appl. No. 11/538,041 Dated Jun. 10, 2009.
Non-Final Office Action from U.S. Appl. No. 11/553,372 Dated Jun. 25, 2009.
Notice of Allowance from U.S. Appl. No. 11/553,372 Dated Sep. 30, 2009.
Notice of Allowance from U.S. Appl. No. 11/553,372 Dated Mar. 12, 2010.
Notice of Allowance from U.S. Appl. No. 11/553,372 Dated Aug. 4, 2010.
Non-Final Office Action from U.S. Appl. No. 11/553,390 Dated Sep. 9, 2009.
Final Office Action from U.S. Appl. No. 11/553,390 Dated Jun. 24, 2010.
Non-Final Office Action from U.S. Appl. No. 11/553,399 Dated Jul. 7, 2009.
Notice of Allowance from U.S. Appl. No. 11/553,399 Dated Oct. 13, 2009.
Notice of Allowance from U.S. Appl. No. 11/553,399 Dated Mar. 22, 2010.
Notice of Allowance from U.S. Appl. No. 11/553,399 Dated Dec. 3, 2010.
Non-Final Office Action from U.S. Appl. No. 11/588,739 Dated Dec. 29, 2009.
Non-Final Office Action from U.S. Appl. No. 11/611,374 Dated Mar. 23, 2009.
Notice of Allowance from U.S. Appl. No. 11/611,374 Dated Sep. 15, 2009.
Notice of Allowance from U.S. Appl. No. 11/611,374 Dated Nov. 30, 2009.
Notice of Allowance from U.S. Appl. No. 11/611,374 Dated Apr. 5, 2010.
Notice of Allowance from U.S. Appl. No. 11/611,374 Dated Jul. 19, 2010.
Notice of Allowance from U.S. Appl. No. 11/611,374 Dated Oct. 29, 2010.
Non-Final Rejection From U.S. Appl. No. 11/672,921 Dated Dec. 8, 2009.
Final Office Action from U.S. Appl. No. 11/672,921 Dated Jul. 23, 2010.
Non-Final Rejection From U.S. Appl. No. 11/672,924 Dated Dec. 14, 2009.
Final Office Action from U.S. Appl. No. 11/672,924 Dated Sep. 7, 2010.
Non-Final Office Action from U.S. Appl. No. 11/702,960 Dated Sep. 25, 2009.
Final Office Action from U.S. Appl. No. 11/702,960 Dated Jun. 21, 2010.
Non-Final Office Action from U.S. Appl. No. 11/702,981 Dated Mar. 11, 2009.
Non-Final Office Action from U.S. Appl. No. 11/702,981 Dated Aug. 19, 2009.
Non-Final Office Action from U.S. Appl. No. 11/762,010 Dated Mar. 20, 2009.
Final Rejection From U.S. Appl. No. 11/762,010 Dated Dec. 4, 2009.
Notice of Allowance from U.S. Appl. No. 11/762,010 Dated Jul. 2, 2010.
Notice of Allowance from U.S. Appl. No. 11/762,010 Dated Oct. 22, 2010.
Non-Final Office Action from U.S. Appl. No. 11/762,013 Dated Jun. 5, 2009.
Notice of Allowance from U.S. Appl. No. 11/762,013 Dated Aug. 17, 2010.
Notice of Allowance from U.S. Appl. No. 11/762,013 Dated Dec. 7, 2010.
Non-Final Office Action from U.S. Appl. No. 11/763,365 Dated Oct. 28, 2009.

Notice of Allowance from U.S. Appl. No. 11/763,365 Dated Jun. 29, 2010.
Notice of Allowance from U.S. Appl. No. 11/763,365 Dated Oct. 20, 2010.
Non-Final Office Action from U.S. Appl. No. 11/828,181 Dated Mar. 2, 2010.
Non-Final Office Action from U.S. Appl. No. 11/828,182 Dated Mar. 29, 2010.
Non-Final Office Action from U.S. Appl. No. 11/855,805 Dated Sep. 21, 2010.
Non-Final Office Action from U.S. Appl. No. 11/858,518 Dated Aug. 14, 2009.
Final Office Action from U.S. Appl. No. 11/858,518 Dated Apr. 21, 2010.
Non-Final Office Action from U.S. Appl. No. 11/858,518 Dated Sep. 8, 2010.
Non-Final Rejection From U.S. Appl. No. 11/929,225 Dated Dec. 14, 2009.
Final Office Action from U.S. Appl. No. 11/929,225 Dated Aug. 27, 2010.
Non-Final Rejection From U.S. Appl. No. 11/929,261 Dated Dec. 14, 2009.
Final Office Action from U.S. Appl. No. 11/929,261 Dated Sep. 7, 2010.
Final Office Action from U.S. Appl. No. 11/929,286 Dated Aug. 20, 2010.
Notice of Allowance from U.S. Appl. No. 11/929,320 Dated Sep. 29, 2010.
Final Office Action from U.S. Appl. No. 11/929,403 Dated Aug. 31, 2010.
Final Office Action from U.S. Appl. No. 11/929,417 Dated Aug. 31, 2010.
Non-Final Office Action from U.S. Appl. No. 11/929,432 Dated Jan. 14, 2010.
Final Office Action from U.S. Appl. No. 11/929,432 Dated Aug. 20, 2010.
Final Office Action from Application No. 11/929,450 Dated Aug. 20, 2010.
Notice of Allowance from U.S. Appl. No. 11/929,483 Dated Oct. 7, 2010.
Non-Final Office Action from U.S. Appl. No. 11/929,500 Dated Oct. 13, 2009.
Final Office Action from U.S. Appl. No. 11/929,500 Dated Jun. 24, 2010.
Non-Final Office Action from U.S. Appl. No. 11/929,571 Dated Mar. 3, 2010.
Non-Final Office Action from U.S. Appl. No. 11/929,631 Dated Mar. 3, 2010.
Final Office Action from U.S. Appl. No. 11/929,631 Dated Nov. 18, 2010.
Non-Final Office Action from U.S. Appl. No. 11/929,636 Dated Mar. 9, 2010.
Non-Final Office Action from U.S. Appl. No. 11/929,655 Dated Mar. 3, 2010.
Final Office Action from U.S. Appl. No. 11/929,655 Dated Nov. 22, 2010.
Notice of Allowance from U.S. Appl. No. 11/939,432 Dated Sep. 24, 2009.
Notice of Allowance from U.S. Appl. No. 11/939,432 Dated Dec. 1, 2009.
Non-Final Office Action from U.S. Appl. No. 11/939,432 Dated Apr. 12, 2010.
Non-Final Office Action from U.S. Appl. No. 11/939,440 Dated Sep. 17, 2010.
Non-Final Office Action from U.S. Appl. No. 11/941,589 Dated Oct. 1, 2009.
Notice of Allowance from U.S. Appl. No. 11/941,589 Dated Oct. 25, 2010.
Non-Final Office Action from U.S. Appl. No. 12/057,306 Dated Oct. 8, 2010.
Non-Final Office Action from U.S. Appl. No. 12/111,819 Dated Apr. 27, 2009.
Notice of Allowance from U.S. Appl. No. 12/111,819 Dated Nov. 20, 2009.
Notice of Allowance from U.S. Appl. No. 12/111,819 Dated Mar. 10, 2010.
Non-Final Office Action from U.S. Appl. No. 12/111,828 Dated Apr. 17, 2009.
Notice of Allowance from U.S. Appl. No. 12/111,828 Dated Dec. 15, 2009.
Non-Final Office Action from U.S. Appl. No. 12/203,100 Dated Dec. 1, 2010.
Non-Final Office Action from U.S. Appl. No. 12/507,682 Dated Mar. 8, 2010.
Non-Final Office Action from U.S. Appl. No. 12/574,628 Dated Jun. 10, 2010.
Non-Final Office Action from U.S. Appl. No. 12/769,428 Dated Nov. 8, 2010.
Non-Final Office Action from U.S. Appl. No. 12/838,896 Dated Sep. 3, 2010.
Search Report From PCT Application No. PCT/US10/038041 Dated Aug. 23, 2010.
Final Office Action from U.S. Appl. No. 11/588,739 Dated Dec. 15, 2010.
Notice of Allowance from U.S. Appl. No. 11/762,010 Dated Feb. 18, 2011.
Final Office Action from U.S. Appl. No. 11/828,182 Dated Dec. 22, 2010.
Non-Final Office Action from U.S. Appl. No. 11/855,826 Dated Jan. 13, 2011.
Notice of Allowance from U.S. Appl. No. 11/939,432 Dated Feb. 18, 2011.
Notice of Allowance from U.S. Appl. No. 12/144,396 Dated Feb. 1, 2011.
Non-Final Office Action from U.S. Appl. No. 12/816,756 Dated Feb. 7, 2011.
Notice of Allowance from U.S. Appl. No. 11/762,013 Dated Feb. 23, 2011.
Notice of Allowance from U.S. Appl. No. 11/929,500 Dated Feb. 24, 2011.
Notice of Allowance from U.S. Appl. No. 11/763,365 Dated Mar. 1, 2011.
Final Office Action from U.S. Appl. No. 12/574,628 Dated Mar. 3, 2011.
Final Office Action from U.S. Appl. No. 11/929,571 Dated Mar. 3, 2011.
Notice of Allowance from U.S. Appl. No. 11/611,374 Dated Mar. 4, 2011.
Notice of Allowance from U.S. Appl. No. 11/929,483 Dated Mar. 4, 2011.
Notice of Allowance from U.S. Appl. No. 11/553,399 Dated Mar. 18, 2011.
Final Office Action from U.S. Appl. No. 12/507,682 Dated Mar. 29, 2011.
Non-Final Office Action from U.S. Appl. No. 11/929,403 Dated Mar. 31, 2011.
Notice of Allowance from U.S. Appl. No. 12/838,896 Dated Apr. 19, 2011.
Notice of Allowance from U.S. Appl. No. 11/702,981 Dated Apr. 25, 2011.
Notice of Allowance from U.S. Appl. No. 11/929,320 Dated May 5, 2011.
Final Office Action from U.S. Appl. No. 11/939,440 Dated May 19, 2011.
Final Office Action from U.S. Appl. No. 11/855,805, Dated May 26, 2011.
Non-Final Office Action from U.S. Appl. No. 11/672,921 Dated May 27, 2011.
Notice of Allowance from U.S. Appl. No. 11/762,010 Dated Jun. 8, 2011.

* cited by examiner

PROGRAMMING OF DIMM TERMINATION RESISTANCE VALUES

CROSS-REFERENCE TO RELATED APPLICATIONS

This application claims the benefit under 35 U.S.C. §119(e) to U.S. Provisional Application Ser. No. 61/185,585, filed on Jun. 9, 2009, which is hereby incorporated by reference in its entirety.

BACKGROUND

This specification relates to controlling of termination resistance values in memory modules.

A typical memory system includes memory modules that are arranged in slots. Each memory module includes a number of memory chips. For example, the memory module can be a dual inline memory module (DIMM) and the memory chips can be dynamic random access memory chips (DRAMs). Memory modules are physically placed in slot connectors and are electrically coupled to other components, e.g., one or more memory controllers, through channels and buses. These channels and buses form transmission lines that are electrically terminated at the connected DIMMs. A memory controller can select any of the DIMMs in a channel for reading or writing, but it will only access one DIMM at a time. The slot in which the DIMM accessed for reading or writing is located is referred to as the "active" slot, while slots in which the other non-accessed DIMMs are located are referred to as the "standby" slots.

A typical DIMM can have a single rank or multiple ranks. A rank is an independent set of DRAMs within the DIMM that can be simultaneously accessed for the full data bit-width of the DIMM, such as 72 bits. The rank to which data is being written is called the target rank for writes. The rank from which data is being read is called the target rank for reads.

SUMMARY

This specification describes technologies relating to controlling of termination resistance values in memory modules.

In general, one aspect of the subject matter described in this specification can be embodied in an apparatus for providing termination resistance in a memory module that includes a plurality of memory circuits; an interface circuit operable to communicate with the plurality of memory circuits and to communicate with a memory controller; and a transmission line electrically coupling the interface circuit to a memory controller, wherein the interface circuit is operable to terminate the transmission line with a single termination resistance that is selected based on a plurality of resistance-setting commands received from the memory controller. Other embodiments of this aspect include corresponding systems, method, computer readable media, and computer program products.

These and other embodiments can optionally include one or more of the following features. The apparatus provides single termination resistance with an on-die termination (ODT) resistor. The interface circuit selects a value of the single termination resistance from a look-up table. The plurality of resistance-setting commands received from the memory controller include a first mode register set (MRS) command and a second MRS command. A value of the single termination resistance during read operations is different from a value of the single termination resistance during write operations. The plurality of memory circuits is a plurality of dynamic random access memory (DRAM) integrated circuits in a dual in-line memory module (DIMM). The single termination resistance has a value that is different from values specified by the resistance-setting commands received from the memory controller.

In general, one aspect of the subject matter described in this specification can be embodied in methods that include the actions of receiving a plurality of resistance-setting commands from a memory controller at an interface circuit, wherein the interface circuit is operable to communicate with a plurality of memory circuits and with the memory controller; selecting a resistance value based on the received plurality of resistance-setting commands; and terminating a transmission line between the interface circuit and the memory controller with a resistor of the selected resistance value. Other embodiments of this aspect include corresponding systems, apparatus, computer readable media, and computer program products.

In general, one aspect of the subject matter described in this specification can be embodied in an apparatus for providing termination resistance in a memory module that includes a first memory circuit having a first termination resistor with a selectable value; a second memory circuit having a second termination resistor with a selectable value; and an interface circuit operable to communicate with the first and the second memory circuits and a memory controller, wherein the interface circuit is operable to select a single value for the first and the second termination resistors that is chosen based on a plurality of resistance-setting commands received from the memory controller. Other embodiments of this aspect include corresponding systems, method, computer readable media, and computer program products.

These and other embodiments can optionally include one or more of the following features. The first and the second termination resistors are ODT resistors. The interface circuit selects a single value for the first and the second termination resistors from a look-up table. The plurality of resistance-setting commands received from the memory controller includes an MRS command and a second MRS command. Values of the first and the second termination resistors during read operations are different from values of the first and the second termination resistors during write operations. The first and the second memory circuits are DRAM integrated circuits in a DIMM. The single value selected by the interface circuit for the first and the second termination resistors is different from values indicated by the plurality of resistance-setting commands received from the memory controller.

Particular embodiments of the subject matter described in this specification can be implemented to realize one or more of the following advantages. The use of the interface circuit for transmission line termination allows for the creation of a single point of termination for a DIMM. This can improve performance, reduce cost, and provide other benefits for a memory module design. An interface circuit for transmission line termination can be used to tune termination values specifically for a DIMM. Standard termination values, for example the termination values mandated by Joint Electron Devices Engineering Council (JEDEC), might not always be optimal for a given DIMM, leading to sub-optimal performance.

The use of an interface circuit for transmission line termination can provide optimal ODT resistance for a given DIMM, which preserves signal integrity and minimizes noise on the transmission line. Furthermore, the use of the interface circuit can also provide termination resistance for a DIMM that is higher than the resistance mandated by a standard. If higher resistance is used while signal integrity is maintained, power dissipation will be reduced because the amount of dissipated power is inversely proportional to the value of termination resistance. As a result, the use of an interface circuit for transmission line termination can improve electrical performance and signal quality within a memory system using one or more DIMMs.

The details of one or more embodiments are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Electrical termination of a transmission line involves placing a termination resistor at the end of the transmission line to prevent the signal from being reflected back from the end of the line, causing interference. In some memory systems, transmission lines that carry data signals are terminated using on-die termination (ODT). ODT is a technology that places an impedance matched termination resistor in transmission lines inside a semiconductor chip. During system initialization, values of ODT resistors used by DRAMs can be set by the memory controller using mode register set (MRS) commands. In addition, the memory controller can turn a given ODT resistor on or turn off at the DRAM with an ODT control signal. When the ODT resistor is turned on with an ODT control signal, it begins to terminate the associated transmission line. For example, a memory controller in a double-data-rate three (DDR3) system can select two static termination resistor values during initialization for all DRAMs within a DIMM using MRS commands. During system operation, the first ODT value (Rtt_Nom) is applied to non-target ranks when the corresponding rank's ODT signal is asserted for both reads and writes. The second ODT value (Rtt_WR) is applied only to the target rank of a write when that rank's ODT signal is asserted.

Figure 1A:
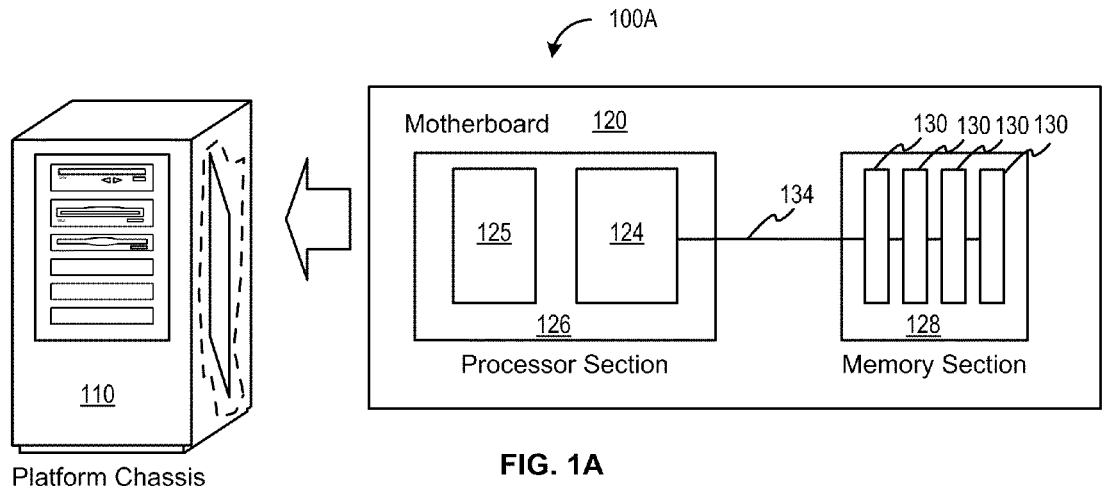
FIGS. 1A-F are block diagrams of example computer systems.

FIGS. 1A-F are block diagrams of example computer systems. FIG. 1A is a block diagram of an example computer system 100A. Computer system 100A includes a platform chassis 110, which includes at least one motherboard 120. In some implementations, the example computer system 100A includes a single case, a single power supply, and a single motherboard/blade. In other implementations, computer system 100A can include multiple cases, power supplies, and motherboards/blades.

The motherboard 120 includes a processor section 126 and a memory section 128. In some implementations, the motherboard 120 includes multiple processor sections 126 and/or multiple memory sections 128. The processor section 126 includes at least one processor 125 and at least one memory controller 124. The memory section 128 includes one or more memory modules 130 that can communicate with the processor section 126 using the memory bus 134 (e.g., when the memory section 128 is coupled to the processor section 126). The memory controller 124 can be located in a variety of places. For example, the memory controller 124 can be implemented in one or more of the physical devices associated with the processor section 126, or it can be implemented in one or more of the physical devices associated with the memory section 128.

Figure 1B:
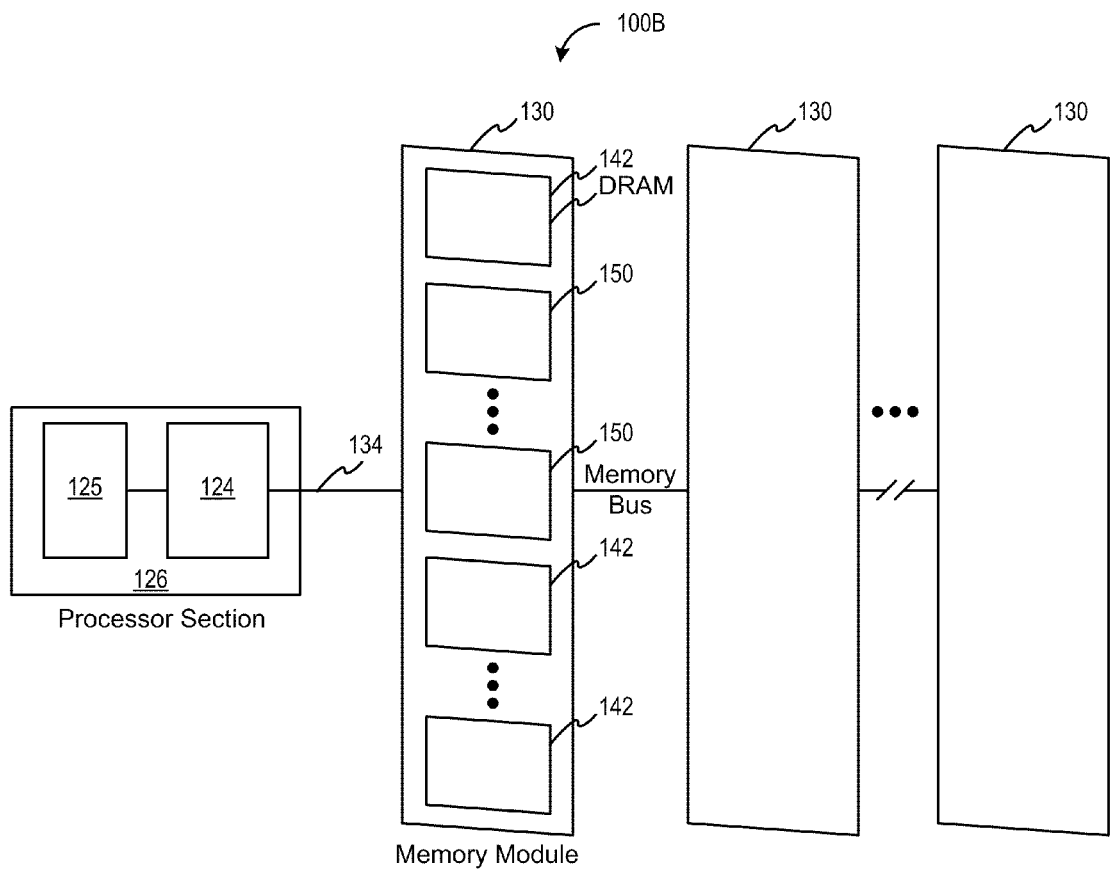

FIG. 1B is a block diagram that illustrates a more detailed view of the processor section 126 and the memory section 128, which includes one or more memory modules 130. Each memory module 130 communicates with the processor section 126 over the memory bus 134. In some implementations, the example memory module 130 includes one or more interface circuits 150 and one or more memory chips 142. While the following discussion generally references a single interface circuit 150, more than one interface circuit 150 can be used. In addition, though the computer systems are described with reference to memory chips as DRAMs, the memory chip 142 can be, but is not limited to, DRAM, synchronous DRAM (SDRAM), double data rate synchronous DRAM (DDR SDRAM, DDR2 SDRAM, DDR3 SDRAM, DDR4 SDRAM, etc.), graphics double data rate synchronous DRAM (GDDR SDRAM, GDDR2 SDRAM, GDDR3 SDRAM, etc.), quad data rate DRAM (QDR DRAM), RAMBUS XDR DRAM (XDR DRAM), fast page mode DRAM (FPM DRAM), video DRAM (VDRAM), extended data out DRAM (EDO DRAM), burst EDO RAM (BEDO DRAM), multibank DRAM (MDRAM), synchronous graphics RAM (SGRAM), phase-change memory, flash memory, and/or any other type of volatile or non-volatile memory.

Figures 1C, 1D:
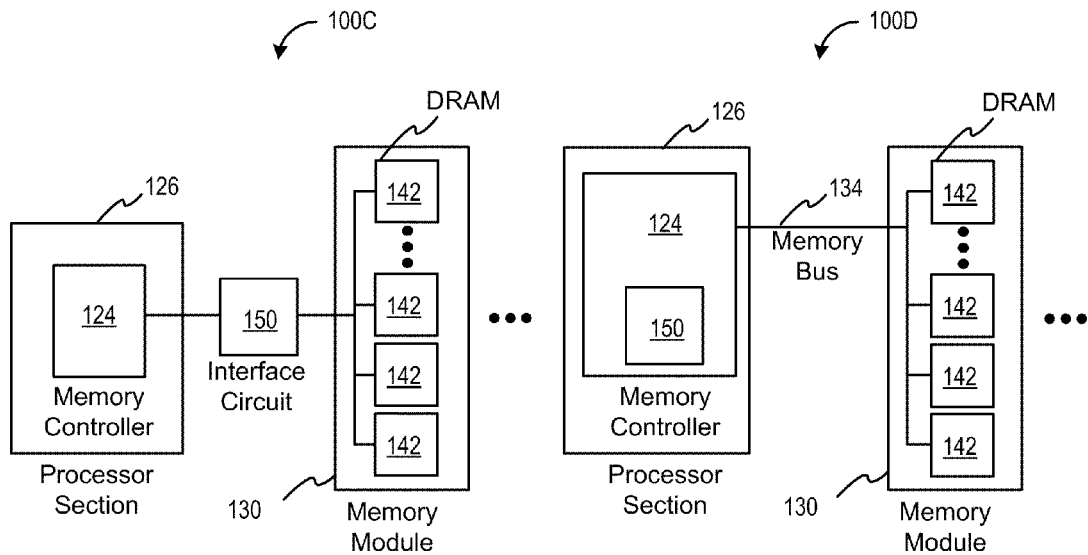
Figures 1E, 1F:
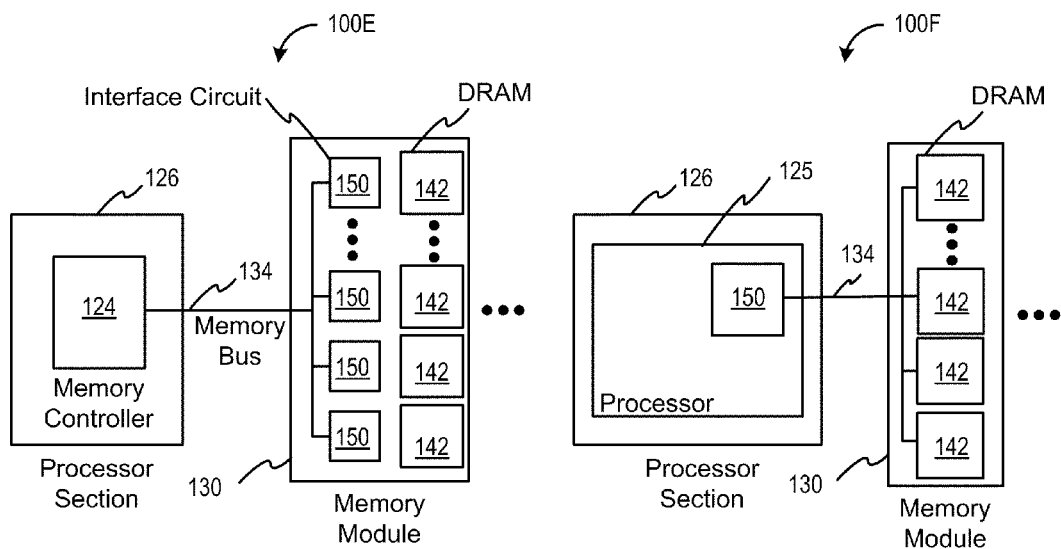

Each of the one or more interface circuits 150 can be, for example, a data buffer, a data buffer chip, a buffer chip, or an interface chip. The location of the interface circuit 150 is not fixed to a particular module or section of the computer system. For example, the interface circuit 150 can be positioned between the processor section 126 and the memory module 130 (FIG. 1C). In some implementations, the interface circuit 150 is located in the memory controller 124, as shown in FIG. 1D. In yet some other implementations, each memory chip 142 is coupled to its own interface circuit 150 within memory module 130 (FIG. 1E). And in another implementation, the interface circuit 150 is located in the processor section 126 or in processor 125, as shown in FIG. 1F.

The interface circuit 150 can act as an interface between the memory chips 142 and the memory controller 124. In some implementations, the interface circuit 150 accepts signals and commands from the memory controller 124 and relays or transmits commands or signals to the memory chips 142. These could be the same or different signals or commands. Each of the one or more interface circuits 150 can also emulate a virtual memory module, presenting the memory controller 124 with an appearance of one or more virtual memory circuits. In the emulation mode, the memory controller 124 interacts with the interface circuit 150 as it would with a physical DRAM or multiple physical DRAMs on a memory module, depending on the configuration of the interface circuit 150. Therefore, in emulation mode, the memory controller 124 could see a single-rank memory module or a multiple-rank memory module in the place of the interface circuit 150, depending on the configuration of the interface circuit 150. In case multiple interface circuits 150 are used for emulation, each interface circuit 150 can emulate a portion (i.e., a slice) of the virtual memory module that is presented to the memory controller 124.

An interface circuit 150 that is located on a memory module can also act as a data buffer for multiple memory chips 142. In particular, the interface circuit 150 can buffer one or more ranks and present a single controllable point of termination for a transmission line. The interface circuit 150 can be connected to memory chips 142 or to the memory controller 124 with one or more transmission lines. The interface circuit 150 can therefore provide a more flexible memory module (e.g., DIMM) termination instead of, or in addition to, the memory chips (e.g., DRAM) located on the memory module.

The interface circuit 150 can terminate all transmission lines or just a portion of the transmission lines of the DIMM.

In case when multiple interface circuits 150 are used, each interface circuit 150 can terminate a portion of the transmission lines of the DIMM. For example, the interface circuit 150 can be used to terminate 8 bits of data. If there are 72 bits of data provided by a DIMM, then nine interface circuits are needed to terminate the entire DIMM. In another example, the interface circuit 150 can be used to terminate 72 bits of data, in which case one interface circuit 150 would be needed to terminate the entire 72-bit DIMM. Additionally, the interface circuit 150 can terminate various transmission lines. For example, the interface circuit 150 can terminate a transmission line between the memory controller 124 and the interface circuit 150. In addition or alternatively, the interface circuit 150 can terminate a transmission line between the interface circuit 150 and one or more of the memory chips 142.

Each of one or more interface circuits 150 can respond to a plurality of ODT signals or MRS commands received from the memory controller 124. In some implementations, the memory controller 124 sends one ODT signal or MRS command per physical rank. In some other implementations, the memory controller 124 sends more than one ODT signal or MRS command per physical rank. Regardless, because the interface circuit 150 is used as a point of termination, the interface circuit 150 can apply different or asymmetric termination values for non-target ranks during reads and writes. Using different non-target DIMM termination values for reads and writes allows for improved signal quality of the channel and reduced power dissipation due to the inherent asymmetry of a termination line.

Moreover, because the interface circuit 150 can be aware of the state of other signals/commands to a DIMM, the interface circuit 150 can choose a single termination value that is optimal for the entire DIMM. For example, the interface circuit 150 can use a lookup table filled with termination values to select a single termination value based on the MRS commands it receives from the memory controller 124. The lookup table can be stored within interface circuit 150 or in other memory locations, e.g., memory controller 124, processor 125, or a memory module 130. In another example, the interface circuit 150 can compute a single termination based on one or more stored formula. The formula can accept input parameters associated with MRS commands from the memory controller 124 and output a single termination value. Other techniques of choosing termination values can be used, e.g., applying specific voltages to specific pins of the interface circuit 150 or programming one or more registers in the interface circuit 150. The register can be, for example, a flip-flop or a storage element.

Tables 1A and 1B show example lookup tables that can be used by the interface circuit 150 to select termination values in a memory system with a two-rank DIMM.

TABLE 1A

Termination values expressed in terms of resistance RZQ.

| | | | | | term_b | | | | |
|---|---|---|---|---|---|---|---|---|---|
| | | disabled | RZQ/4 | RZQ/2 | RZQ/6 | RZQ/12 | RZQ/8 | reserved | reserved |
| term_a | disabled | disabled | RZQ/4 | RZQ/2 | RZQ/6 | RZQ/12 | RZQ/8 | TBD | TBD |
| | RZQ/4 | | RZQ/8 | RZQ/6 | RZQ/12 | RZQ/12 | RZQ/12 | TBD | TBD |
| | RZQ/2 | | | RZQ/4 | RZQ/8 | RZQ/12 | RZQ/12 | TBD | TBD |
| | RZQ/6 | | | | RZQ/12 | RZQ/12 | RZQ/12 | TBD | TBD |
| | RZQ/12 | | | | | RZQ/12 | RZQ/12 | TBD | TBD |
| | RZQ/8 | | | | | | RZQ/12 | TBD | TBD |
| | reserved | | | | | | | TBD | TBD |
| | reserved | | | | | | | | TBD |

TABLE 1B

Termination values of Table 1A with RZQ = 240 ohm

| | | | | | term_b | | | | |
|---|---|---|---|---|---|---|---|---|---|
| | | inf | 60 | 120 | 40 | 20 | 30 | reserved | reserved |
| term_a | inf | inf | 60 | 120 | 40 | 20 | 30 | TBD | TBD |
| | 60 | | 30 | 40 | 20 | 20 | 20 | TBD | TBD |
| | 120 | | | 60 | 30 | 20 | 20 | TBD | TBD |
| | 40 | | | | 20 | 20 | 20 | TBD | TBD |
| | 20 | | | | | 20 | 20 | TBD | TBD |
| | 30 | | | | | | 20 | TBD | TBD |
| | reserved | | | | | | | TBD | TBD |
| | reserved | | | | | | | | TBD |

Because the example memory system has two ranks, it would normally require two MRS commands from the memory controller 124 to set ODT values in each of the ranks. In particular, memory controller 124 would issue an MRS0 command that would set the ODT resistor values in DRAMs of the first rank (e.g., as shown by term_a in Tables 1A-B) and would also issue an ODT0 command signal that would activate corresponding ODT resistors in the first rank. Memory controller 124 would also issue an MRS1 command that would set the ODT resistor values in DRAMs of the second rank (e.g., as shown by term_b in Tables 1A-B) and would also issue an ODT1 command signal that would enable the corresponding ODT resistors in the second rank.

However, because the interface circuit 150 is aware of signals/commands transmitted by the memory controller 124 to both ranks of the DIMM, it can select a single ODT resistor value for both ranks using a lookup table, for example, the resistor value shown in Tables 1A-B. The interface circuit 150 can then terminate the transmission line with the ODT resistor having the single selected termination value.

In addition or alternatively, the interface circuit 150 can also issue signals/commands to DRAMs in each rank to set their internal ODTs to the selected termination value. This single termination value may be optimized for multiple ranks to improve electrical performance and signal quality.

For example, if the memory controller 124 specifies the first rank's ODT value equal to RZQ/6 and the second rank's ODT value equal to RZQ/12, the interface circuit 150 will signal or apply an ODT resistance value of RZQ/12. The resulting value can be found in the lookup table at the intersection of a row and a column for given resistance values for rank 0 (term_a) and rank 1 (term_b), which are received from the memory controller 124 in the form of MRS commands. In case the RZQ variable is set to 240 ohm, the single value signaled or applied by the interface circuit 150 will be 240/12=20 ohm. A similar lookup table approach can be applied to Rtt_Nom values, Rtt_WR values, or termination values for other types of signals.

In some implementations, the size of the lookup table is reduced by 'folding' the lookup table due to symmetry of the entry values (Rtt). In some other implementations, an asymmetric lookup table is used in which the entry values are not diagonally symmetric. In addition, the resulting lookup table entries do not need to correspond to the parallel resistor equivalent of Joint Electron Devices Engineering Council (JEDEC) standard termination values. For example, the table entry corresponding to 40 ohm for the first rank in parallel with 40 ohm for the second rank (40//40) does not have to result in a 20 ohm termination setting. In addition, in some implementations, the lookup table entries are different from Rtt_Nom or Rtt_WR values required by the JEDEC standards.

While the above discussion focused on a scenario with a single interface circuit 150, the same techniques can be applied to a scenario with multiple interface circuits 150. For example, in case multiple interface circuits 150 are used, each interface circuit 150 can select a termination value for the portion of the DIMM that is being terminated by that interface circuit 150 using the techniques discussed above.

Figure 2:
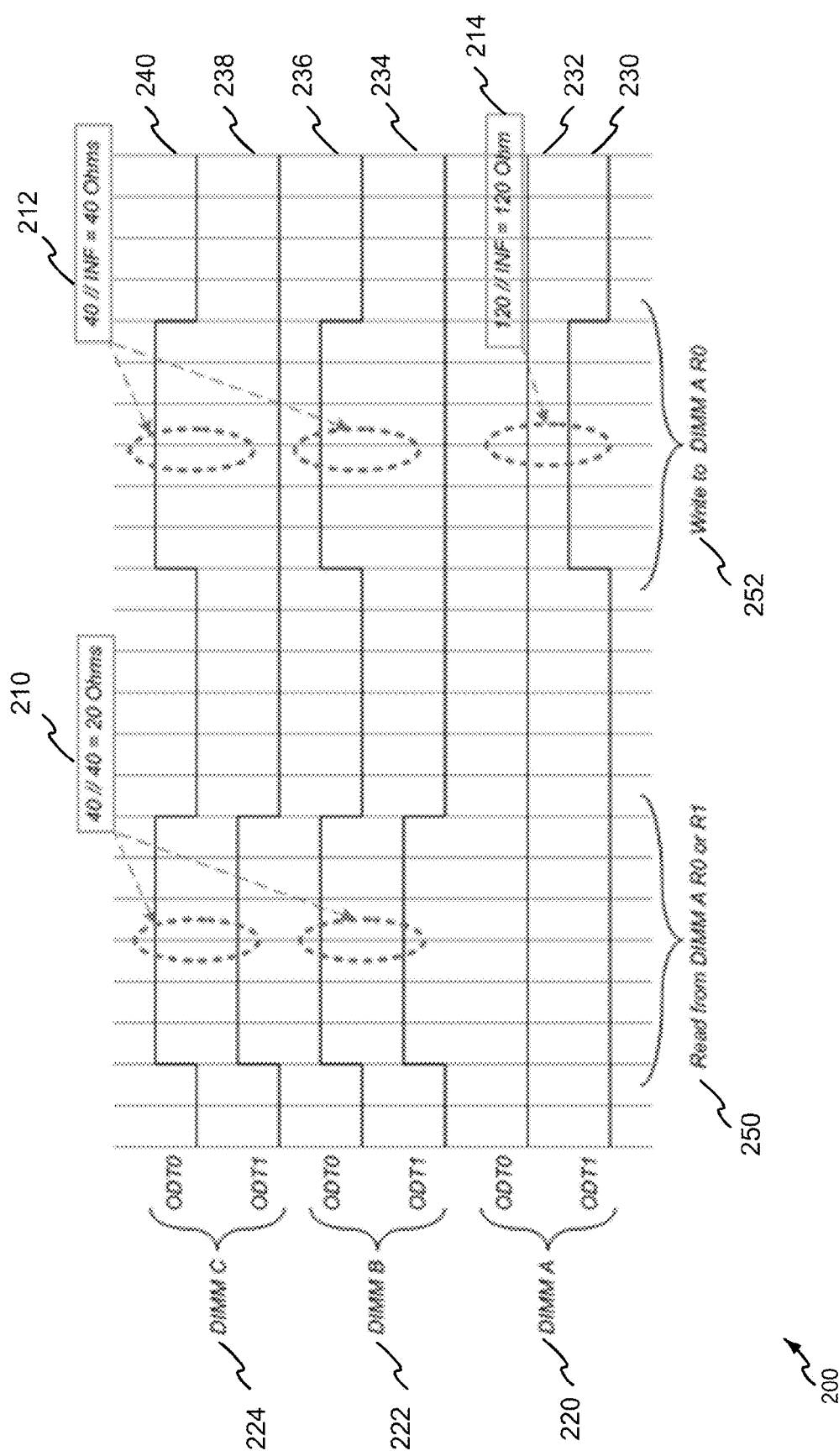
FIG. 2 is an example timing diagram for a 3-DIMMs per channel (3DPC) configuration.

FIG. 2 is an example timing diagram 200 for a 3-DIMMs per channel (3DPC) configuration, where each DIMM is a two-rank DIMM. The timing diagram 200 shows timing waveforms for each of the DIMMs in three slots: DIMM A 220, DIMM B 222, and DIMM C 224. In FIG. 2, each DIMM receives two ODT signal waveforms for ranks 0 and 1 (ODT0, ODT1), thus showing a total of six ODT signals: signals 230 and 232 for DIMM A, signals 234 and 236 for DIMM B, and signals 238 and 240 for DIMM C. In addition, the timing diagram 200 shows a Read signal 250 applied to DIMM A either at rank 0 (R0) or rank 1 (R1). The timing diagram 200 also shows a Write signal 252 applied to DIMM A at rank 0 (R0).

The values stored in the lookup table can be different from the ODT values mandated by JEDEC. For example, in the 40//40 scenario (R0 Rtt_Nom=ZQ/6=40 ohm, R1 Rtt_Nom=ZQ/6=40 ohm, with ZQ=240 ohm), a traditional two-rank DIMM system relying on JEDEC standard will have its memory controller set DIMM termination values of either INF (infinity or open circuit), 40 ohm (assert either ODT0 or ODT1), or 20 ohm (assert ODT0 and ODT1). On the other hand, the interface circuit 150 relying on the lookup table can set the ODT resistance value differently from memory controller relying on JEDEC-mandated values. For example, for the same values of R0 Rtt_Nom and R1 Rtt_Nom, the interface circuit 150 can select a resistance value that is equal to ZQ/12 (20 ohm) or ZQ/8 (30 ohm) or some other termination value. Therefore, even though the timing diagram 200 shows a 20 ohm termination value for the 40//40 scenario, the selected ODT value could correspond to any other value specified in the lookup table for the specified pair of R0 and R1 values.

When the interface circuit 150 is used with one-rank DIMMs, the memory controller can continue to provide ODT0 and ODT1 signals to distinguish between reads and writes even though ODT1 signal might not have any effect in a traditional memory channel. This allows single and multiple rank DIMMs to have the same electrical performance. In some other implementations, various encodings of the ODT signals are used. For example, the interface circuit 150 can assert ODT0 signal for non-target DIMMs for reads and ODT1 signal for non-target DIMMs for writes.

In some implementations, termination resistance values in multi-rank DIMM configurations are selected in a similar manner. For example, an interface circuit provides a multi-rank DIMM termination resistance using a look-up table. In another example, an interface circuit can also provide a multi-rank DIMM termination resistance that is different from the JEDEC standard termination value. Additionally, an interface circuit can provide a multi-rank DIMM with a single termination resistance. An interface circuit can also provide a multi-rank DIMM with a termination resistance that optimizes electrical performance. The termination resistance can be different for reads and writes.

In some implementations, a DIMM is configured with a single load on the data lines but receives multiple ODT input signals or commands. This means that while the DIMM can terminate the data line with a single termination resistance, the DIMM will appear to the memory controller as though it has two termination resistances that can be configured by the memory controller with multiple ODT signals and MRS commands. In some other implementations a DIMM has an ODT value that is a programmable function of the of ODT input signals that are asserted by the system or memory controller.

Figure 3A:
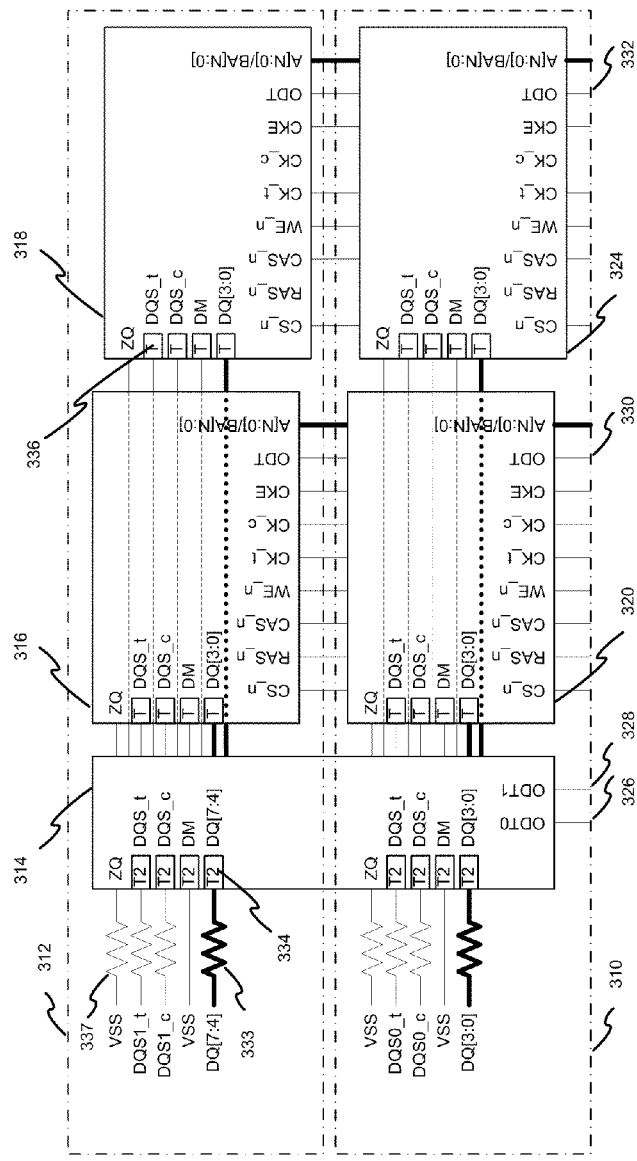
FIGS. 3A-C are block diagrams of an example memory module using an interface circuit to provide DIMM termination.
Figure 3C:
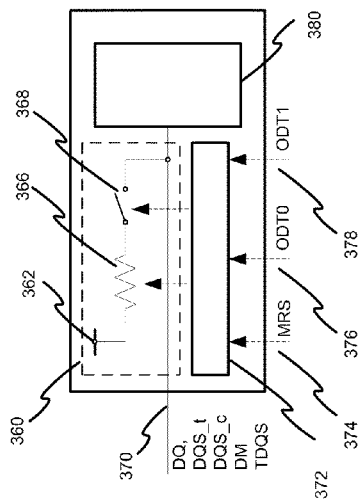
Figure 3B:
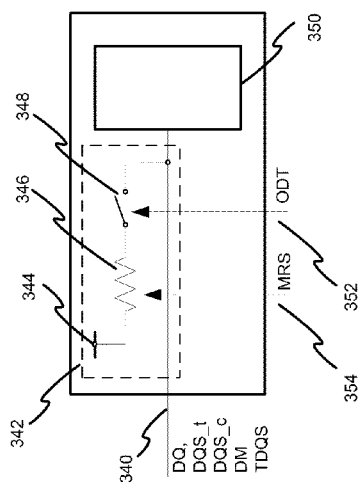

FIGS. 3A-C are block diagrams of an example memory module using an interface circuit to provide DIMM termination. In some implementations, FIGS. 3A-C include an interface circuit similar to interface circuit 150 described in the context of the computer systems in FIGS. 1A-F. In particular, DRAMs 316, 318, 320, and 324 can have attributes comparable to those described with respect to memory chips 142, respectively. Likewise, the interface circuit 314 can have attributes comparable to, and illustrative of, the interface circuits 150 shown in FIGS. 1A-F. Similarly, other elements within FIGS. 3A-C have attributes comparable to, and illustrative of, corresponding elements in FIGS. 1A-F.

Referring to FIG. 3A, the interface circuit 314 is coupled to DRAMs 316, 318, 320, and 324. The interface circuit 314 is coupled to the memory controller using memory bus signals DQ[3:0], DQ[7:4], DQS1_t, DQS1_c, DQS0_t, DQS0_c, VSS. Additionally, other bus signals (not shown) can be included. FIG. 3A shows only a partial view of the DIMM, which provides 8 bits of data to the system through DQ[7:4] bus signal. For an ECC DIMM with 72 bits of data, there would be a total of 36 DRAM devices and there would be 9 instances of interface circuit 314. In FIG. 3A, the interface circuit combines two virtual ranks to present a single physical rank to the system (e.g., to a memory controller). DRAMs 316 and 320 belong to a virtual rank 0 and DRAMs 318 and 324 are parts of virtual rank 1. As shown, DRAMs devices 316 and 318 together with interface circuit 314 operate to form a single larger virtual DRAM device 312. In a similar fashion, DRAM devices 320 and 324 together with interface circuit 314 operate to form a virtual DRAM device 310.

The virtual DRAM device 310 represents a "slice" of the DIMM, as it provides a "nibble" (e.g., 4 bits) of data to the memory system. DRAM devices 316 and 318 also represent a slice that emulates a single virtual DRAM 312. The interface circuit 314 thus provides termination for two slices of DIMM comprising virtual DRAM devices 310 and 312. Additionally, as a result of emulation, the system sees a single-rank DIMM.

In some implementations, the interface circuit 314 is used to provide termination of transmission lines coupled to DIMM. FIG. 3A shows resistors 333, 334, 336, 337 that can be used, either alone or in various combinations with each other, for transmission line termination. First, the interface circuit 314 can include one or more ODT resistors 334 (annotated as T2). For example, ODT resistor 334 may be used to terminate DQ[7:4] channel. It is noted that DQ[7:4] is a bus having four pins: DQ7, DQ6, DQ5, DQ4 and thus may require four different ODT resistors. In addition, DRAMs 316, 318, 320, and 324 can also include their own ODT resistors 336 (annotated as T).

In some implementations, the circuit of FIG. 3A also includes one or more resistors 333 that provide series stub termination of the DQ signals. These resistors are used in addition to any parallel DIMM termination, for example, provided by ODT resistors 334 and 336. Other similar value stub resistors can also be used with transmission lines associated with other data signals. For example, in FIG. 3A, resistor 337 is a calibration resistor connected to pin ZQ.

FIG. 3A also shows that the interface circuit 314 can receive ODT control signals though pins ODT0 326 and ODT1 328. As described above, the ODT signal turns on or turns off a given ODT resistor at the DRAM. As shown in FIG. 3A, the ODT signal to DRAM devices in virtual rank 0 is ODT0 326 and the ODT signal to the DRAM devices in virtual rank 1 is ODT1 328.

Because the interface circuit 314 provides for flexibility pins for signals ODT 330, ODT 332, ODT0 326, and ODT1 328 may be connected in a number of different configurations.

In one example, ODT0 326 and ODT1 328 are connected directly to the system (e.g., memory controller); ODT 330 and ODT 332 are hard-wired; and interface circuit 314 performs the function determine the value of DIMM termination based on the values of ODT0 and ODT1 (e.g., using a lookup table as describe above with respect to Tables 1A-B). In this manner, the DIMM can use the flexibility provided by using two ODT signals, yet provide the appearance of a single physical rank to the system.

For example, if the memory controller instructs rank 0 on the DIMM to terminate to 40 ohm and rank 1 to terminate to 40 ohm, without the interface circuit, a standard DIMM would then set termination of 40 ohm on each of two DRAM devices. The resulting parallel combination of two nets each terminated to 40 ohm would then appear electrically to be terminated to 20 ohm. However, the presence of interface circuit provides for additional flexibility in setting ODT termination values. For example, a system designer may determine, through simulation, that a single termination value of 15 ohm (different from the normal, standard-mandated value of 20 ohm) is electrically better for a DIMM embodiment using interface circuits. The interface circuit 314, using a lookup table as described, may therefore present a single termination value of 15 ohm to the memory controller.

In another example, ODT0 326 and ODT1 328 are connected to a logic circuit (not shown) that can derive values for ODT0 326 and ODT1 328 not just from one or more ODT signals received from the system, but also from any of the control, address, or other signals present on the DIMM. The signals ODT 330 and ODT 332 can be hard-wired or can be wired to the logic circuit. Additionally, there can be fewer or more than two ODT signals between the logic circuit and interface circuit 314. The one or more logic circuits can be a CPLD, ASIC, FPGA, or part of an intelligent register (on an R-DIMM or registered-DIMM for example), or a combination of such components.

In some implementations, the function of the logic circuit is performed by a modified JEDEC register with a number of additional pins added. The function of the logic circuit can also be performed by one or more interface circuits and shared between the interface circuits using signals (e.g., ODT 330 and ODT 332) as a bus to communicate the termination values that are to be used by each interface circuit.

In some implementations, the logic circuit determines the target rank and non-target ranks for reads or writes and then communicates this information to each of the interface circuits so that termination values can be set appropriately. The lookup table or tables for termination values can be located in the interface circuits, in one or more logic circuit, or shared/partitioned between components. The exact partitioning of the lookup table function to determine termination values between the interface circuits and any logic circuit depends, for example, on the economics of package size, logic function and speed, or number of pins.

In another implementation, signals ODT 330 and ODT 332 are used in combination with dynamic termination of the DRAM (i.e., termination that can vary between read and write operations and also between target and non-target ranks) in addition to termination of the DIMM provided by interface circuit 314. For example, the system can operate as though the DIMM is a single-rank DIMM and send termination commands to the DIMM as though it were a single-rank DIMM. However, in reality, there are two virtual ranks and two DRAM devices (such as DRAM 316 and DRAM 318) that each have their own termination in addition to the interface circuit. A system designer has an ability to vary or tune the logical and timing behavior as well as the values of termination in three places: (a) DRAM 316; (b) DRAM 318; and (c) interface circuit 314, to improve signal quality of the channel and reduce power dissipation.

A DIMM with four physical ranks and two logical ranks can be created in a similar fashion to the one described above. A computer system using 2-rank DIMMs would have two ODT signals provided to each DIMM. In some implementations, these two ODT signals are used, with or without an additional logic circuit(s) to adjust the value of DIMM termination at the interface circuits and/or at any or all of the DRAM devices in the four physical ranks behind the interface circuits.

FIG. 3B is a block diagram illustrating the example structure of an ODT block within a DIMM. The structure illustrated in FIG. 3B embodies the ODT resistor 336 (box T in DRAMs 316, 318, 320, and 324) described with respect to FIG. 3A. In particular, ODT block 342 includes an ODT resistor 346 that is coupled to ground/reference voltage 344 on one side and a switch 348 on the other side. The switch 348 is controlled with ODT signal 352, which can turn the switch either on or off. When the switch 348 is turned on, it connects the ODT resistor 346 to transmission line 340, permitting ODT resistor 346 to terminate the transmission line 340. When the switch 348 is turned off, it disconnects the ODT resistor 346 from the transmission line 340. In addition, transmission line 340 can be coupled to other circuitry 350 within DIMM. The value of the ODT resistor 346 can be selected using MRS command 354.

FIG. 3C is a block diagram illustrating the exemplary structure of ODT block within an interface circuit. The structure illustrated in FIG. 3B embodies the ODT resistor 366 (box T2 in DRAMs 316, 318, 320, and 324) described above with respect to FIG. 3A. In particular, ODT block 360 includes an ODT resistor 366 that is coupled to ground/reference voltage 362 on one side and a switch 368 on the other side. In addition, the ODT block 360 can be controlled by circuit 372, which can receive ODT signals and MRS commands from a memory controller. Circuit 372 is a part of the interface circuit 314 in FIG. 3A and is responsible for controlling the ODT. The switch 368 can be controlled with either ODT0 signal 376 or ODT1 signal 378, which are supplied by the circuit 372.

In some implementations, circuit 372 transmits the same MRS commands or ODT signals to the ODT resistor 366 that it receives from the memory controller. In some other implementations, circuit 372 generates its own commands or signals that are different from the commands/signals it receives from the memory controller. Circuit 372 can generate these MRS commands or ODT signals based on a lookup table and the input commands/signals from the memory controller. When the switch 368 receives an ODT signal from the circuit 372, it can either turn on or turn off. When the switch 368 is turned on, it connects the ODT resistor 366 to the transmission line 370, permitting ODT resistor 366 to terminate the transmission line 370. When the switch 368 is turned off, it disconnects the ODT resistor 366 from the transmission line 370. In addition, transmission line 370 can be coupled to other circuitry 380 within the interface circuit. The value of the ODT resistor 366 can be selected using MRS command 374.

Figure 4:
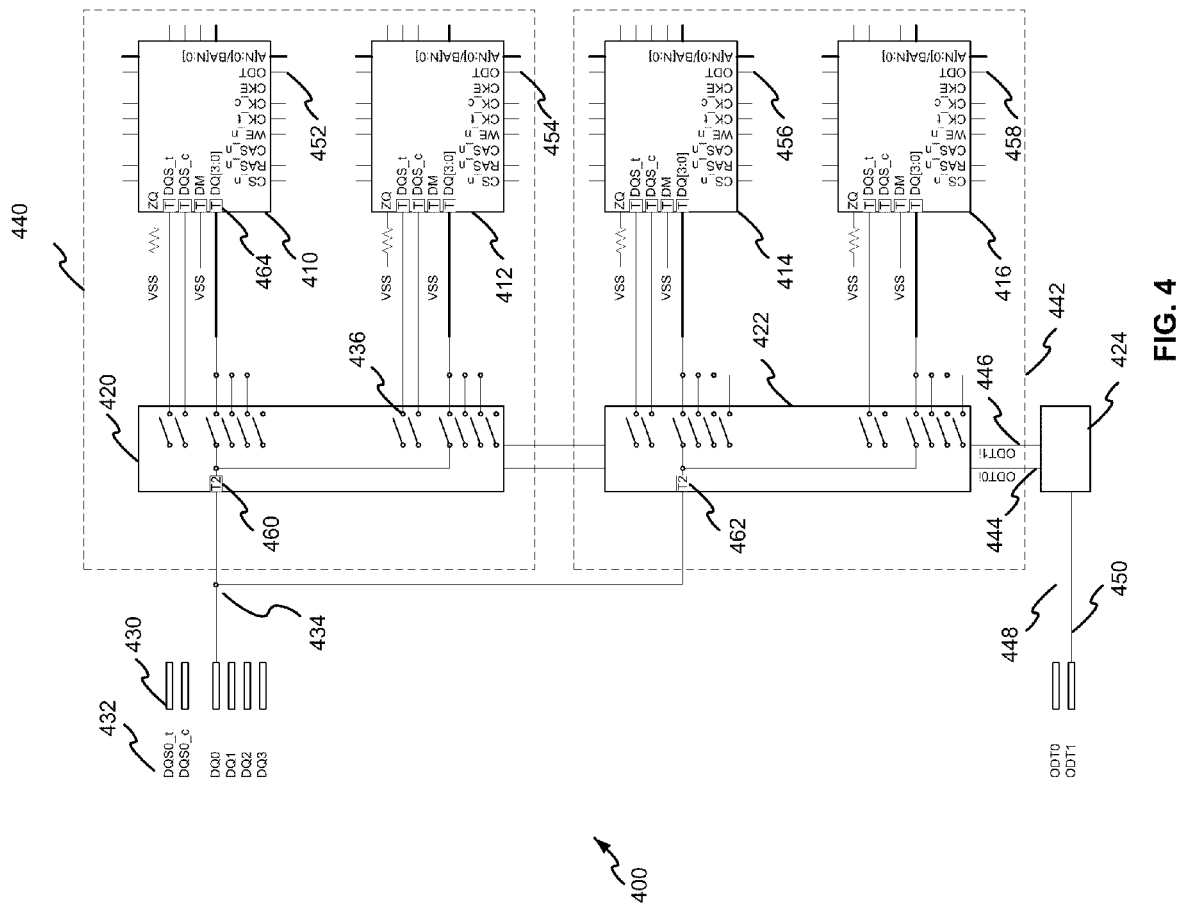
FIG. 4 is a block diagram illustrating a slice of an example 2-rank DIMM using two interface circuits for DIMM termination per slice.

FIG. 4 is a block diagram illustrating one slice of an example 2-rank DIMM using two interface circuits for DIMM termination per slice. In some implementations, FIG. 4 includes an interface circuit similar to those previously described in FIGS. 1A-F and 3A-C. Elements within FIG. 4 can have attributes comparable to and illustrative of corresponding elements in FIGS. 1A-F and 3A-C.

FIG. 4 shows a DIMM 400 that has two virtual ranks and four physical ranks DRAM 410 is in physical rank number zero, DRAM 412 is in the first physical rank, DRAM 414 is in the second physical rank, DRAM 416 is in the third physical rank. DRAM 410 and DRAM 412 are in virtual rank 0 440. DRAM 414 and DRAM 416 are in virtual rank 1 442. In general, DRAMs 410, 412, 414, and 416 have attributes comparable to and illustrative to DRAMs discussed with respect to FIGS. 1A-F and 3A-C. For example, DRAMs 410, 412, 414, and 416 can include ODT resistors 464, which were discussed with respect to FIG. 3B.

In addition, FIG. 4 shows an interface circuit 420 and an interface circuit 422. In some implementations, interface circuits 420 and 422 have attributes similar to the interface circuits described with respect to FIGS. 1A-F and 3A-C. For example, interface circuits 420 and 422 can include ODT resistors 460 and 462, which function similarly to ODT resistor 366 discussed above with respect to FIG. 3C.

FIG. 4 also shows one instance of a logic circuit 424. DIMM 400 can include other components, for example, a register, smart (i.e. modified or enhanced) register device or register circuit for R-DIMMs, a discrete PLL and/or DLL, voltage regulators, SPD, other non-volatile memory devices, bypass capacitors, resistors, and other components. In addition or alternatively, some of the above components can be integrated with each other or with other components.

In some implementation, DIMM 400 is connected to the system (e.g., memory controller) through conducting fingers 430 of the DIMM PCB. Some, but not all, of these fingers are illustrated in FIG. 4, for example, the finger for DQS0_t, shown as finger 430. Each finger receives a signal and corresponds to a signal name, e.g., DQS0_t 432. DQ0 434 is an output (or pin) of the interface circuits 420 and 422. In some implementations, these two outputs are tied, dotted or connected to an electrical network. Any termination applied to any pin on this electrical network thus applies to the entire electrical network (and the same is true for other similar signals and electrical networks). Furthermore, interface circuits 420 and 422 are shown as containing multiple instances of switch 436. Net DQ0 434 is connected through switches 436 to signal pin DQ[0] of DRAM 410, DRAM 412, DRAM 414, and DRAM 416.

In some implementations, switch 436 is a single-pole single-throw (SPST) switch. In some other implementations, switch 436 is mechanical or non-mechanical. Regardless, the switch 436 can be one of various switch types, for example, SPST, DPDT, or SPDT, a two-way or bidirectional switch or circuit element, a parallel combination of one-way, uni-directional switches or circuit elements, a CMOS switch, a multiplexor (MUX), a de-multiplexer (de-MUX), a CMOS bidirectional buffer; a CMOS pass gate, or any other type of switch.

The function of the switches 436 is to allow the physical DRAM devices behind the interface circuit to be connected together to emulate a virtual DRAM. These switches prevent such factors as bus contention, logic contention or other factors that may prevent or present unwanted problems from such a connection. Any logic function or switching element that achieves this purpose can be used. Any logical or electrical delay introduced by such a switch or logic can be compensated for. For example, the address and/or command signals can be modified through controlled delay or other logical devices.

Switch 436 is controlled by signals from logic circuit 424 coupled to the interface circuits, including interface circuit 420 and interface circuit 422. In some implementations, switches 436 in the interface circuits are controlled so that only one of the DRAM devices is connected to any given signal net at one time. Thus, for example, if the switch connecting net DQ0 434 to DRAM 410 is closed, then switches connecting net DQ0 434 to DRAMs 412, 414, 416 are open.

In some implementations, the termination of nets, such as DQ0 434, by interface circuits 420 and 422 is controlled by inputs ODT0*i* 444 (where "i" stands for internal) and ODT1*i* 446. While the term ODT has been used in the context of DRAM devices, the on-die termination used by an interface circuit can be different from the on-die termination used by a DRAM device. Since ODT0*i* 444 and ODT1*i* 446 are internal signals, the interface circuit termination circuits can be different from standard DRAM devices. Additionally, the signal levels, protocol, and timing can also be different from standard DRAM devices.

The ability to adjust the interface circuit's ODT behavior provides the system designer with an ability to vary or tune the values and timing of ODT, which may improve signal quality of the channel and reduce power dissipation. In one example, as part of the target rank, interface circuit 420 provides termination when DRAM 410 is connected to net DQ0 434. In this example, the interface circuit 420 can be controlled by ODT0*i* 444 and ODT1*i* 446. As part of the non-target rank, interface circuit 422 can also provide a different value of termination (including no termination at all) as controlled by signals ODT0*i* 444 and ODT1*i* 446.

In some implementations, the ODT control signals or commands from the system are ODT0 448 and ODT1 450. The ODT input signals or commands to the DRAM devices are shown by ODT signals 452, 454, 456, 458. In some implementations, the ODT signals 452, 454, 456, 458 are not connected. In some other implementations, ODT signals 452, 454, 456, 458 are connected, for example, as: (a) hardwired (i.e. to VSS or VDD or other fixed voltage); (b) connected to logic circuit 424; (c) directly connected to the system; or (d) a combination of (a), (b), and (c).

As shown in FIG. 4, transmission line termination can be placed in a number of locations, for example, (a) at the output of interface circuit 420; (b) the output of interface circuit 422; (c) the output of DRAM 410; (d) the output of DRAM 412; (e) the output of DRAM 414; (f) the output of DRAM 416; or may use any combination of these. By choosing location for termination, the system designer can vary or tune the values and timing of termination to improve signal quality of the channel and reduce power dissipation.

Furthermore, in some implementations, a memory controller in a DDR3 system sets termination values to different values than used in normal operation during different DRAM modes or during other DRAM, DIMM and system modes, phases, or steps of operation. DRAM modes can include initialization, wear-leveling, initial calibration, periodic calibration, DLL off, DLL disabled, DLL frozen, or various power-down modes.

In some implementations, the logic circuit 424 may also be programmed (by design as part of its logic or caused by control or other signals or means) to operate differently during different modes/phases of operation so that a DIMM with one or more interface circuits can appear, respond to, and communicate with the system as if it were a standard or traditional DIMM without interface circuits. Thus, for example, logic circuit 424 can use different termination values during different phases of operation (e.g., memory reads and memory writes) either by pre-programmed design or by external command or control, or the logic timing may operate differently. For example, logic circuit 424 can use a termination value during read operations that is different from a termination value during write operations.

As a result, in some implementations, no changes to a standard computer system (motherboard, CPU, BIOS, chipset, component values, etc.) need to be made to accommodate DIMM 400 with one or more interface circuits. Therefore, while in some implementations the DIMM 400 with the interface circuit(s) may operate differently from a standard or traditional DIMM (for example, by using different termination values or different timing than a standard DIMM), the modified DIMM would appear to the computer system/memory controller as if it were operating as a standard DIMM.

In some implementations, there are two ODT signals internal to the DIMM 400. FIG. 4 shows these internal ODT signals between logic circuit 424 and the interface circuits 420 and 422 as ODT0$i$ 444 and ODT1$i$ 446. Depending on the flexibility of termination required, the size and complexity of the lookup table, and the type of signaling interface used, there may be any number of signals between logic circuit 424 and the interface circuits 420 and 422. For example, the number of internal ODT signals can be same, fewer, or greater than the number of ODT signals from the system/memory controller.

In some implementations, there are two interface circuits per slice of a DIMM 400. Consequently, an ECC DIMM with 72 bits would include 2×72/4=36 interface circuits. Similarly, a 64-bit DIMM would include 2×64/4=32 interface circuits.

In some implementations, interface circuit 420 and interface circuit 422 are combined into a single interface circuit, resulting in one interface circuit per slice. In these implementations, a DIMM would include 72/4=18 interface circuits. Other number (8, 9, 16, 18, etc.), arrangement, or integration of interface circuits may be used depending on a type of DIMM, cost, power, physical space on the DIMM, layout restrictions and other factors.

In some alternative implementations, logic circuit 424 is shared by all of the interface circuits on the DIMM 400. In these implementations, there would be one logic circuit per DIMM 400. In yet other implementations, a logic circuit or several logic circuits are positioned on each side of a DIMM 400 (or side of a PCB, board, card, package that is part of a module or DIMM, etc.) to simplify PCB routing. Any number of logic circuits may be used depending on the type of DIMM, the number of PCBs used, or other factors.

Other arrangements and levels of integration are also possible. There arrangements can depend, for example, on silicon die area and cost, package size and cost, board area, layout complexity as well as other engineering and economic factors. For example, all of the interface circuits and logic circuits can be integrated together into a single interface circuit. In another example, an interface circuit and/or logic circuit can be used on each side of a PCB or PCBs to improve board routing. In yet another example, some or all of the interface circuits and/or logic circuits can be integrated with one or more register circuits or any of the other DIMM components on an R-DIMM.

Figure 5:
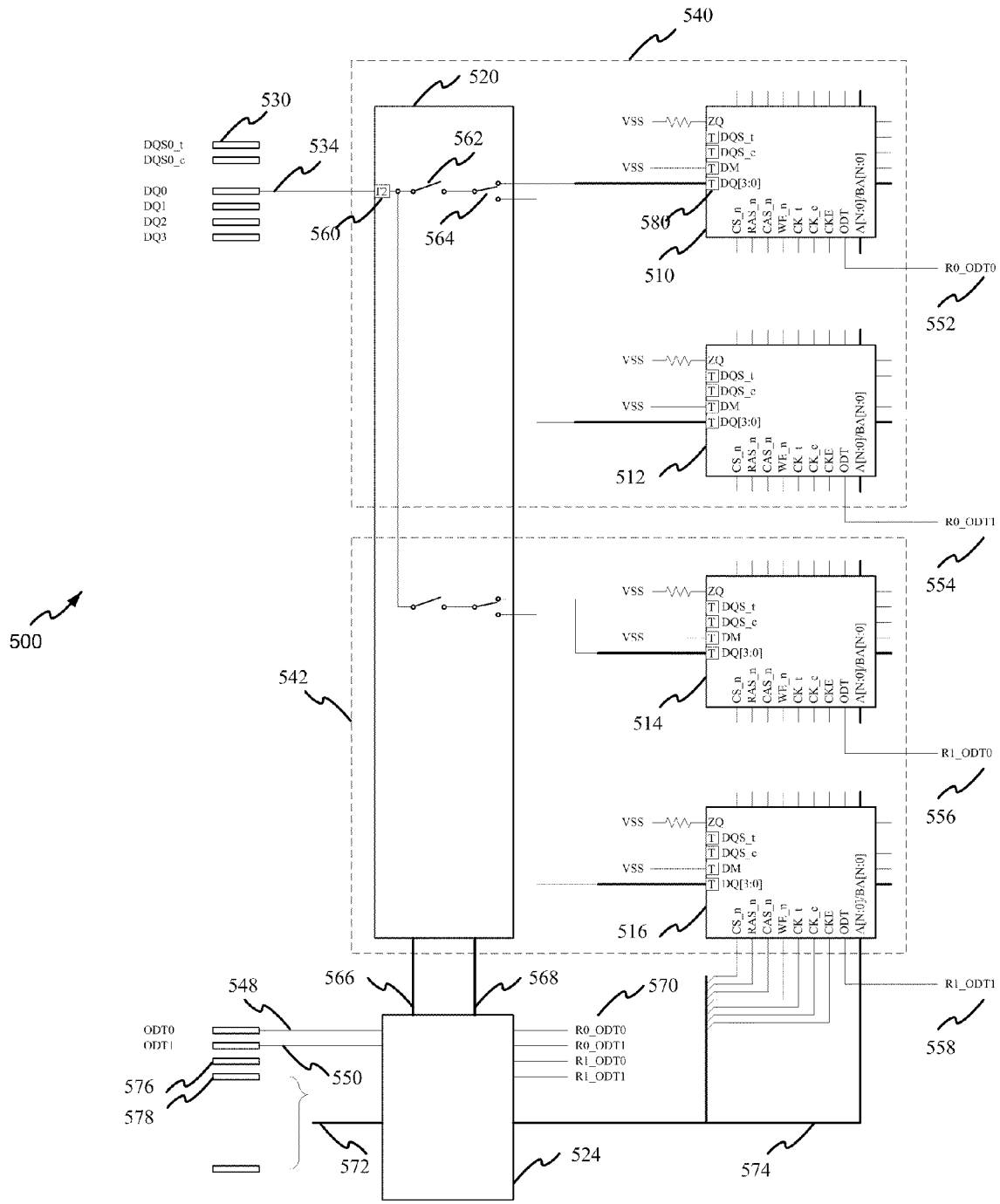
FIG. 5 is a block diagram illustrating a slice of an example 2-rank DIMM with one interface circuit per slice.

FIG. 5 is a block diagram illustrating a slice of an example 2-rank DIMM 500 with one interface circuit per slice. In some implementations, DIMM 500 includes on or more interface circuit as described above in FIGS. 1A-F, 3A-C, and 4. Additionally, elements within DIMM 500 can have attributes similar to corresponding elements in FIGS. 1A-F, 3A-C, and 4. For example, interface circuit 520 can include ODT resistor 560, which can be similar to ODT resister 366, discussed with respect to FIG. 3C. Likewise, DRAM devices 510, 512, 514, and 516 can include ODT resistors 580, which can be similar to ODT resistor 346 discussed with respect to FIG. 3B.

DIMM 500 has virtual rank 0 540, with DRAM devices 510 and 512 and virtual rank 1 542, with DRAM devices 514 and 516. Interface circuit 520 uses switches 562 and 564 to either couple or isolate data signals such as DQ0 534 to the DRAM devices. Signals, for example, DQ0 534 are received from the system through connectors e.g., finger 530. A register circuit 524 provides ODT control signals on bus 566 and switch control signals on bus 568 to interface circuit 520 and/or other interface circuits. Register circuit 524 can also provide standard JEDEC register functions. For example, register circuit 524 can receive inputs 572 that include command, address, control, and other signals from the system through connectors, e.g., finger 578. In some implementations, other signals are not directly connected to the register circuit 524, as shown in FIG. 5 by finger 576. The register circuit 524 can transmit command, address, control and other signals (possibly modified in timing and values) through bus 574 to the DRAM devices, for example, DRAM device 516. Not all the connections of command, address, control and other signals between DRAM devices are shown in FIG. 5.

The register circuit 524 can receive inputs ODT0 548 and ODT1 550 from a system (e.g., a memory controller of a host system). The register circuit 524 can also alter timing and behavior of ODT control before passing this information to interface circuit 520 through bus 566. The interface circuit 520 can then provide DIMM termination at DQ pin with ODT resistor 560. In some implementations, the timing of termination signals (including when and how they are applied, changed, removed) and determination of termination values are split between register circuit 524 and interface circuit 520.

Furthermore, in some implementations, the register circuit 524 also creates ODT control signals 570: R0_ODT0, R0_ODT1, R1_ODT0, R1_ODT1. These signals can be coupled to DRAM device signals 552, 554, 556 and 558. In some alternative implementations, (a) some or all of signals 552, 554, 556 and 558 may be hard-wired (to VSS, VDD or other potential); (b) some or all of signals 570 are created by interface circuit 520; (c) some or all of signals 570 are based on ODT0 548 and ODT1 550; (d) some or all of signals 570 are altered in timing and value from ODT0 548 and ODT1 550; or (e) any combination of implementations (a)-(d).

Figure 6:
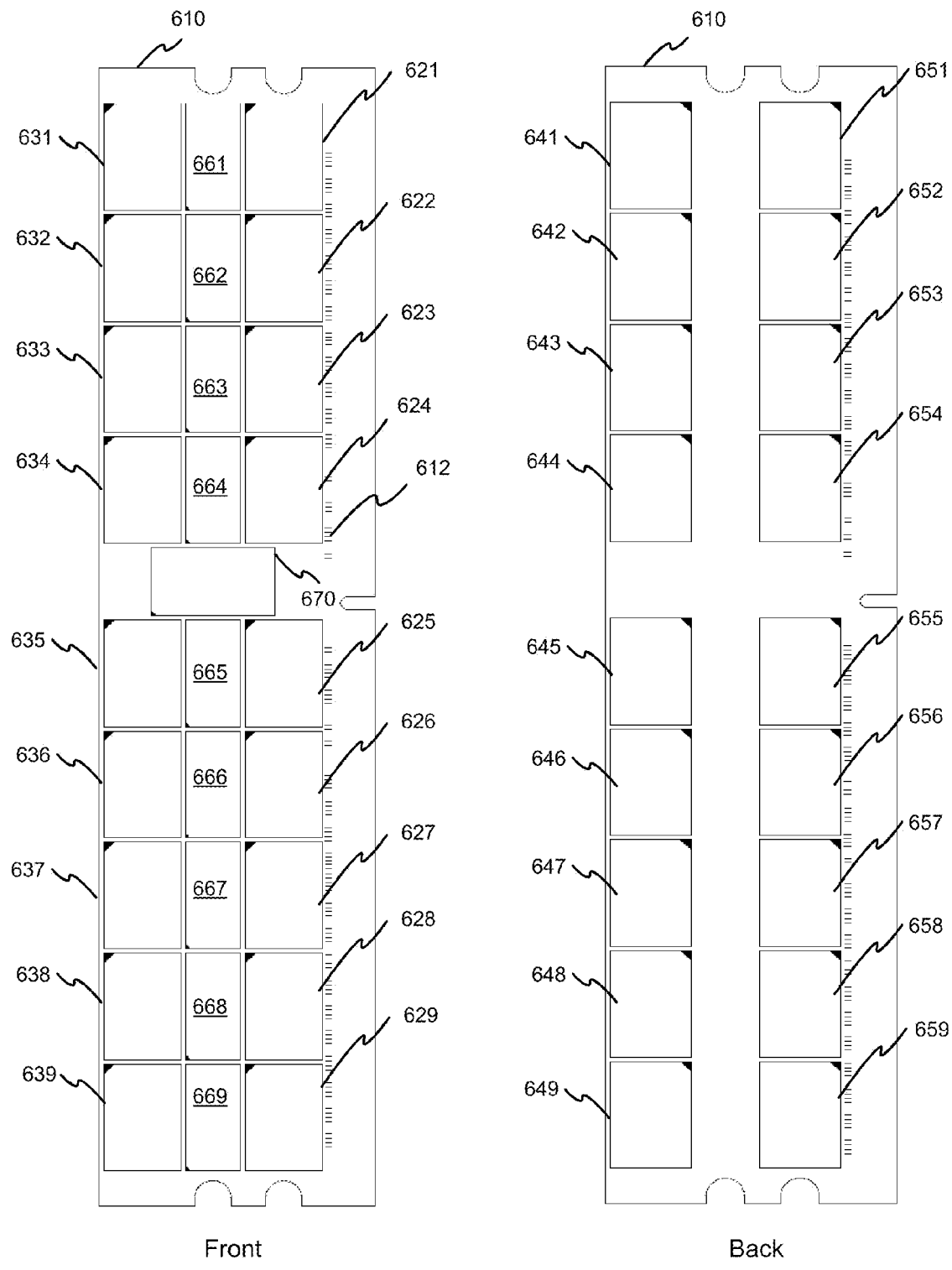
FIG. 6 illustrates a physical layout of an example printed circuit board (PCB) of a DIMM with an interface circuit.

FIG. 6 illustrates an physical layout of an example printed circuit board (PCB) 600 of a DIMM with an interface circuit. In particular, PCB 600 includes an ECC R-DIMM with nine interface circuits and thirty six DRAMs 621. Additionally, FIG. 6 shows the two sides of a single DIMM 610. The DIMM 610 includes fingers 612 that permit the DIMM 610 to be electrically coupled to a system. Furthermore, as shown in FIG. 6, PCB 600 includes 36 DRAM (621-629, front/bottom; 631-639 front/top; 641-649 back/top; 651-659 back/bottom).

FIG. 6 also shows nine interface circuits 661-669, located in the front/middle. In addition, FIG. 6 shows one register circuit 670 located in front/center of the PCB 600. The register circuit 670 can have attributes comparable to those described with respect to interface circuit 150. DIMMs with a different number of DRAMs, interface circuits, or layouts can be used.

In some implementations, interface circuits can be located at the bottom of the DIMM PCB, so as to place termination electrically close to fingers 612. In some other implementations, DRAMs can be arranged on the PCB 600 with different orientations. For example, their longer sides can be arranged parallel to the longer edge of the PCB 600. DRAMs can also be arranged with their longer sides being perpendicular to the longer edge of the PCB 600. Alternatively, the DRAMs can be arranged such that some have long sides parallel to the longer edge of the PCB 600 and others have longer sides perpendicular to the longer edge of the PCB 600. Such arrangement may be useful to optimize high-speed PCB routing. In some other implementations, PCB 600 can include more than one register circuit. Additionally, PCB 600 can include more than one PCB sandwiched to form a DIMM. Furthermore, PCB 600 can include interface circuits placed on both side of the PCB.

Figure 7:
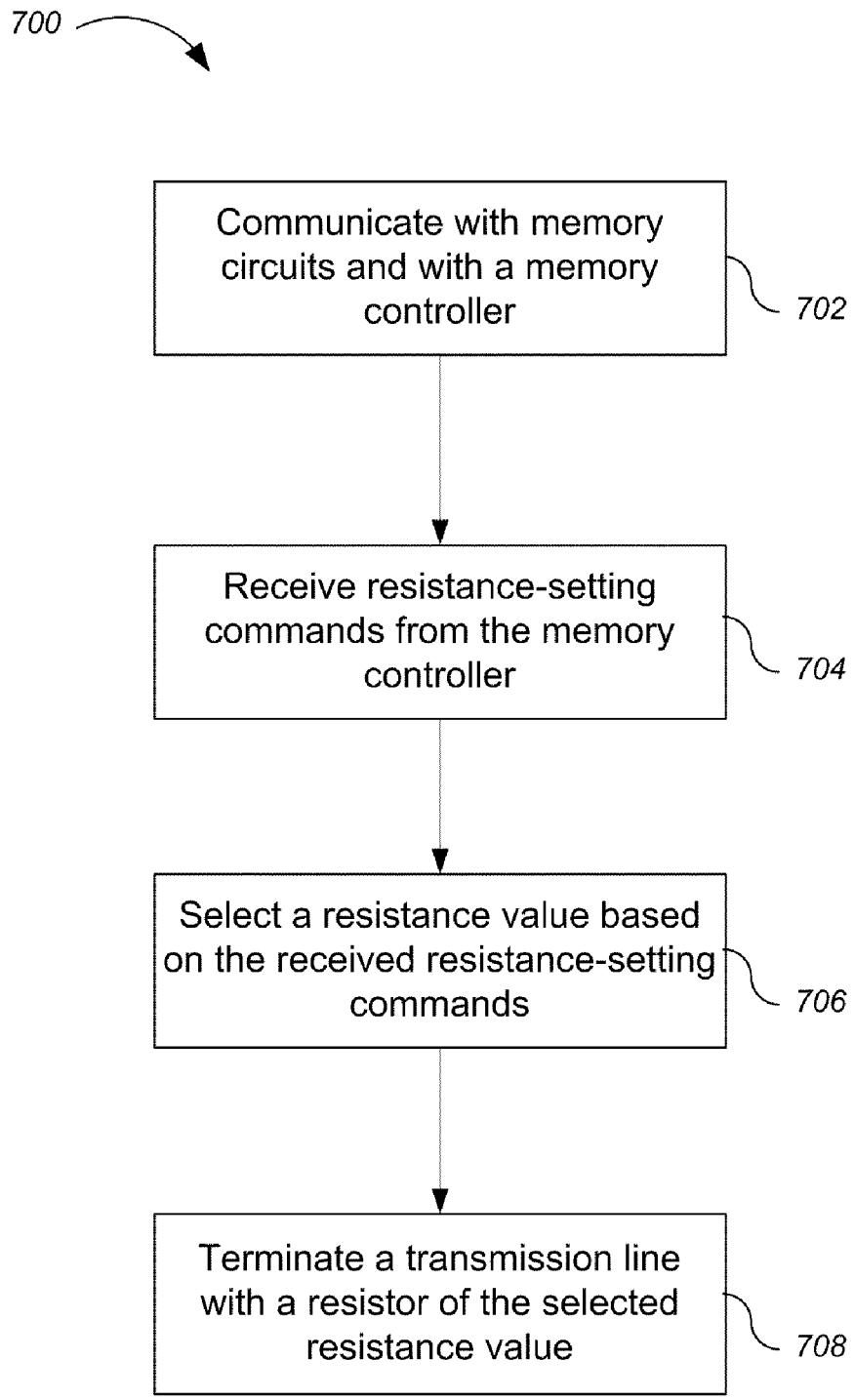
FIG. 7 is a flowchart illustrating an example method for providing termination resistance in a memory module.

FIG. 7 is a flowchart illustrating an example method 700 for providing termination resistance in a memory module. For convenience, the method 700 will be described with reference to an interface circuit that performs the method (e.g., interface circuit 150). It should be noted, however, that some or all steps of method 700 can be performed by other components within computer systems 100A-F.

The interface circuit communicates with memory circuits and with a memory controller (step 702). The memory circuits are, for example, dynamic random access memory (DRAM) integrated circuits in a dual in-line memory module (DIMM).

The interface circuit receives resistance-setting commands from the memory controller (step 704). The resistance-setting commands can be mode register set (MRS) commands directed to on-die termination (ODT) resistors within the memory circuits.

The interface circuit selects a resistance value based on the received resistance-setting commands (step 706). The interface circuit can select a resistance value from a look-up table. In addition, the selected resistance value can depend on the type of operation performed by the system. For example, the selected resistance value during read operations can be different from the selected resistance value during write operations. In some implementations, the selected resistance value is different from the values specified by the resistance-setting commands. For example, the selected resistance value can be different from a value prescribed by JEDEC standard for DDR3 DRAM.

The interface circuit terminates a transmission line with a resistor of the selected resistance value (step 708). The resistor can be an on-die termination (ODT) resistor. The transmission line can be, for example, a transmission line between the interface circuit and the memory controller.

While the foregoing is directed to embodiments of the present invention, other and further embodiments of the invention may be devised without departing from the basic scope thereof. Therefore, the scope of the present invention is determined by the claims that follow. In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures can be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. An apparatus for providing termination resistance in a memory module, the apparatus comprising:
a plurality of memory circuits;
an interface circuit operable to communicate with the plurality of memory circuits and to communicate with a memory controller; and
a transmission line electrically coupling the interface circuit to the memory controller,
wherein the interface circuit is operable to terminate the transmission line with a single termination resistance that is selected based on a plurality of resistance-setting commands received from the memory controller, and wherein the single termination resistance has a value that is different from values specified by the resistance-setting commands received from the memory controller.

2. The apparatus of claim 1, wherein the single termination resistance is provided by an on-die termination (ODT) resistor.

3. The apparatus of claim 1, wherein the interface circuit selects a value of the single termination resistance from a look-up table.

4. The apparatus of claim 1, wherein the plurality of resistance-setting commands received from the memory controller comprises a first mode register set (MRS) command and a second MRS command.

5. The apparatus of claim 1, wherein a value of the single termination resistance during read operations is different from a value of the single termination resistance during write operations.

6. The apparatus of claim 1, wherein the plurality of memory circuits is a plurality of dynamic random access memory (DRAM) integrated circuits in a dual in-line memory module (DIMM).

7. The apparatus of claim 1, further comprising a resistor operable to provide the single termination resistance value, wherein the resistor is activated in response to a resistance-setting command issued by the interface circuit.

8. A method for providing termination resistance in a memory module, the method comprising:
receiving a plurality of resistance-setting commands from a memory controller at an interface circuit, wherein the interface circuit is operable to communicate with a plurality of memory circuits and with the memory controller;
selecting a resistance value based on the received plurality of resistance-setting commands; and
terminating a transmission line between the interface circuit and the memory controller with a resistor of the selected resistance value, wherein the selected resistance value is different from the values specified by the resistance-setting commands.

9. The method of claim 8, wherein the selected resistance value is a value for an on-die termination (ODT) resistor.

10. The method of claim 8, wherein the selected resistance value is selected from a look-up table.

11. The method of claim 8, wherein the selected resistance value during read operations is different from the selected resistance value during write operations.

12. The method of claim 8, wherein the plurality of memory circuits is a plurality of dynamic random access memory (DRAM) integrated circuits in a dual in-line memory module (DIMM).

13. The method of claim 8, wherein the plurality of resistance-setting commands is a plurality of mode register set (MRS) commands.

14. An apparatus for providing termination resistance in a memory module, the apparatus comprising:
a first memory circuit having a first termination resistor with a selectable value;
a second memory circuit having a second termination resistor with a selectable value; and
an interface circuit operable to communicate with the first and the second memory circuits and a memory controller, wherein the interface circuit is operable to select a single value for the first and the second termination resistors that is chosen based on a plurality of resistance-setting commands received from the memory controller, wherein the single value selected by the interface circuit for the first and the second termination resistors is different from values indicated by the plurality of resistance-setting commands received from the memory controller.

15. The apparatus of claim 14, wherein the first and the second termination resistors are on-die termination (ODT) resistors.

16. The apparatus of claim 14, wherein the interface circuit selects a single value for the first and the second termination resistors from a look-up table.

17. The apparatus of claim 14, wherein the plurality of resistance-setting commands received from the memory controller comprises a first mode register set (MRS) command and a second MRS command.

18. The apparatus of claim 14, wherein values of the first and the second termination resistors during read operations are different from values of the first and the second termination resistors during write operations.

19. The apparatus of claim 14, wherein the first and the second memory circuits are dynamic random access memory (DRAM) integrated circuits in a dual in-line memory module (DIMM).

20. The apparatus of claim 14, wherein the first and second terminations resistors are activated in response to one or more resistance-setting commands issued by the interface circuit.

* * * * *